(12) United States Patent
Adachi et al.

(10) Patent No.: US 12,576,558 B2
(45) Date of Patent: Mar. 17, 2026

(54) THERMOPLASTIC PREPREG, FIBER-REINFORCED PLASTIC, AND MANUFACTURING METHOD THEREFOR

(71) Applicant: Toray Industries, Inc., Tokyo (JP)

(72) Inventors: Kentaro Adachi, Ehime (JP); Terumasa Tsuda, Ehime (JP); Kota Kawahara, Ehime (JP); Masato Honma, Ehime (JP); Hiroaki Matsutani, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 378 days.

(21) Appl. No.: 18/022,195

(22) PCT Filed: Aug. 30, 2021

(86) PCT No.: PCT/JP2021/031685
§ 371 (c)(1),
(2) Date: Feb. 20, 2023

(87) PCT Pub. No.: WO2022/050213
PCT Pub. Date: Mar. 10, 2022

(65) Prior Publication Data
US 2023/0302687 A1 Sep. 28, 2023

(30) Foreign Application Priority Data

Sep. 4, 2020 (JP) ................................. 2020-148771
Sep. 4, 2020 (JP) ................................. 2020-148772

(51) Int. Cl.
*B29B 11/16* (2006.01)
*B29K 101/12* (2006.01)
(Continued)

(52) U.S. Cl.
CPC ................ *B29B 11/16* (2013.01); *B32B 3/30* (2013.01); *B32B 5/022* (2013.01); *B32B 5/266* (2021.05);
(Continued)

(58) Field of Classification Search
CPC .......... B29B 11/16; B32B 5/266; B32B 3/30; B32B 5/022; B32B 2260/023;
(Continued)

(56) References Cited

U.S. PATENT DOCUMENTS 9,962,904 B2 5/2018 Hatanaka et al.
2017/0057208 A1* 3/2017 Oosawa .................. B29C 70/46
(Continued)

FOREIGN PATENT DOCUMENTS

JP 2008207544 A 9/2008
JP 2010235779 A 10/2010
(Continued)

OTHER PUBLICATIONS

International Search Report and Written Opinion for International Application No. PCT/JP2021/031685, dated Nov. 9, 2021, 8 pages.

*Primary Examiner* — Alicia J Weydemeyer
*Assistant Examiner* — Laura B Figg
(74) *Attorney, Agent, or Firm* — BUCHANAN INGERSOLL & ROONEY PC

(57) ABSTRACT
A fiber-reinforced plastic capable of coping with a more complicated shape while maintaining lightweight properties and mechanical properties is provided, where a thermoplastic prepreg is obtained by impregnating a discontinuous reinforcing fiber web impregnated with a thermoplastic resin, the thermoplastic prepreg satisfying at least one of the following features (A) or (B):
feature (A): a plurality of incisions cutting at least a part of discontinuous reinforcing fibers constituting the discontinuous reinforcing fiber web; and
(Continued)

feature (B): a fiber length variation region in which a coefficient of variation in fiber length of the discontinuous reinforcing fibers constituting the discontinuous reinforcing fiber web is 40% or more.

23 Claims, 4 Drawing Sheets

(51) Int. Cl.

| | |
|---|---|
| *B29K 307/04* | (2006.01) |
| *B32B 3/30* | (2006.01) |
| *B32B 5/02* | (2006.01) |
| *B32B 5/26* | (2006.01) |

(52) U.S. Cl.
CPC ...... *B29K 2101/12* (2013.01); *B29K 2307/04* (2013.01); *B32B 2260/023* (2013.01); *B32B 2260/046* (2013.01); *B32B 2262/106* (2013.01); *B32B 2307/54* (2013.01)

(58) Field of Classification Search
CPC ........ B32B 2260/046; B32B 2262/106; B32B 2307/54; B29K 2101/12; B29K 2307/04
See application file for complete search history.

(56) References Cited

U.S. PATENT DOCUMENTS

| | | | |
|---|---|---|---|
| 2017/0327982 A1* | 11/2017 | Muramatsu ............ | D21H 13/50 |
| 2019/0002655 A1 | 1/2019 | Takebe et al. | |
| 2019/0232528 A1 | 8/2019 | Tsuda et al. | |
| 2019/0299495 A1* | 10/2019 | Fujioka ................... | B29C 43/52 |
| 2020/0282670 A1 | 9/2020 | Miura et al. | |
| 2021/0016474 A1 | 1/2021 | Shinohara et al. | |

FOREIGN PATENT DOCUMENTS

| | | | |
|---|---|---|---|
| JP | 2013166923 A | 8/2013 | |
| JP | 2017043095 A | 3/2017 | |
| JP | 2017119430 A | 7/2017 | |
| JP | 2018062671 A | 4/2018 | |
| JP | 2018043412 A | 3/2022 | |
| WO | 2015029634 A1 | 3/2015 | |
| WO | 2016084824 A1 | 6/2016 | |
| WO | 2017110528 A1 | 6/2017 | |
| WO | 2017110533 A1 | 6/2017 | |
| WO | 2018055932 A1 | 3/2018 | |
| WO | 2019189384 A1 | 10/2019 | |

* cited by examiner

[Fig. 1]
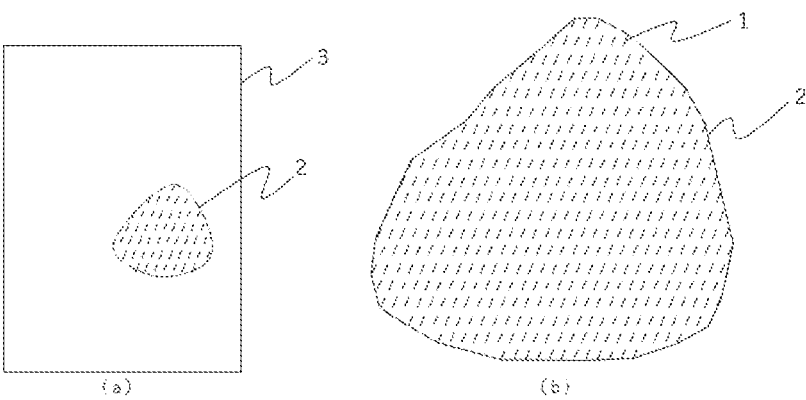
(a)　　　　　　　　　(b)
[Fig. 2]
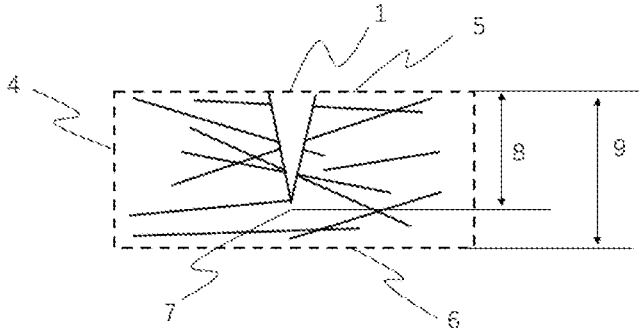

[Fig. 3]
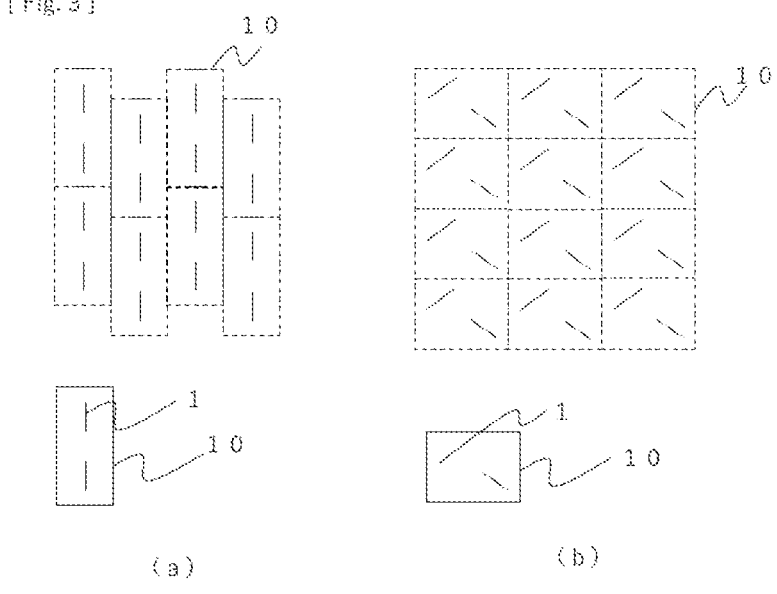
(a)
(b)
[Fig. 4]
15      13
Frequency[%]
11
14   14
14
12
12
12
12
12
Fiber length[mm]

[Fig. 5]
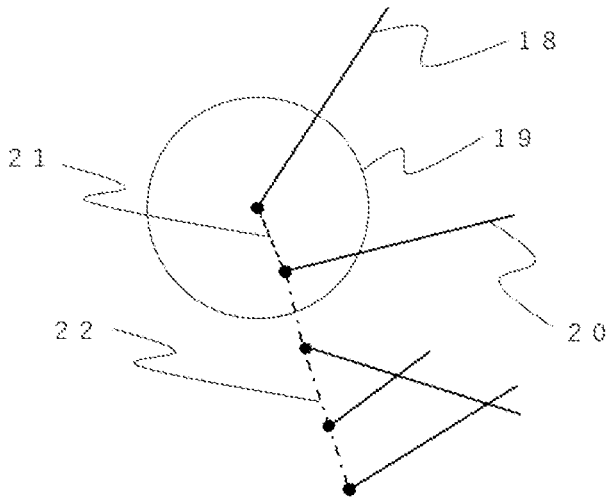
[Fig. 6]

[ Fig. 7 ]
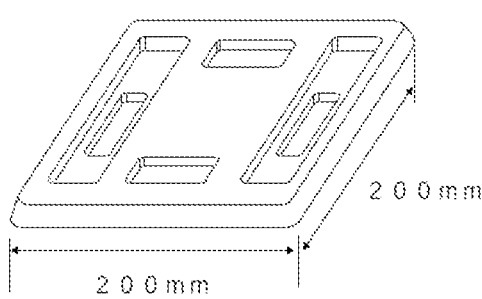
[ Fig. 8 ]
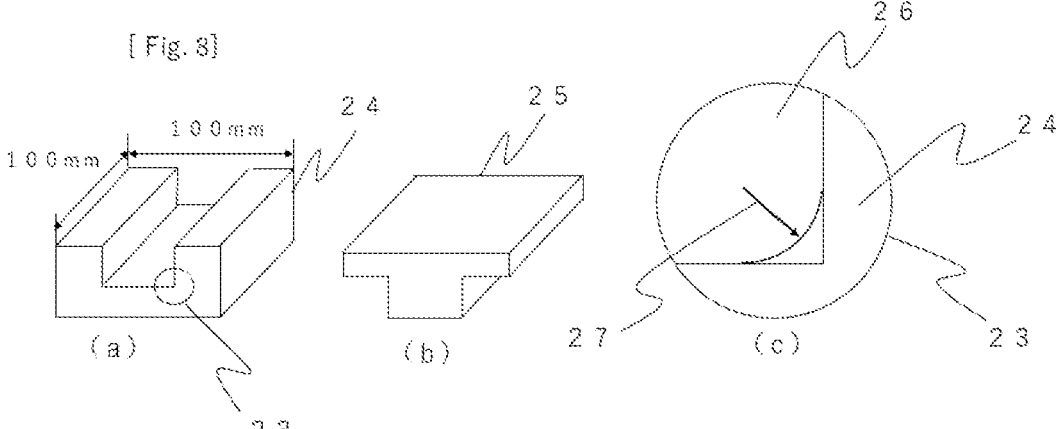

THERMOPLASTIC PREPREG, FIBER-REINFORCED PLASTIC, AND MANUFACTURING METHOD THEREFOR

CROSS REFERENCE TO RELATED APPLICATIONS

This application is the U.S. National Phase application of PCT/JP2021/031685, filed Aug. 30, 2021 which claims priority to Japanese Patent Application No. 2020-148771, filed Sep. 4, 2020 and Japanese Patent Application No. 2020-148772, filed Sep. 4, 2020, the disclosures of these applications being incorporated herein by reference in their entireties for all purposes.

FIELD OF THE INVENTION

The present invention relates to a thermoplastic prepreg containing reinforcing fibers and a thermoplastic matrix resin, a method for producing the same, and a fiber-reinforced plastic molded from a prepreg base material and a method for producing the same.

BACKGROUND OF THE INVENTION

The fiber-reinforced plastic consisting of reinforcing fibers and a matrix resin are excellent in specific strength and specific rigidity, and are widely used in electrical and electronic applications, civil engineering and construction applications, automobile applications, sports applications, aircraft applications, and more. In recent years, with regard to the fiber-reinforced plastic for industrial products such as automobiles, aircraft, and sports products, market demands for followability to a complicated shape of a molding material during molding and lightweight properties of a molded article have been increasing year by year. In order to meet such requirements, a press-molded article of fiber-reinforced plastic having a complicated shape and excellent mechanical properties and lightweight properties are widely used for various industrial applications.

Specifically, Patent Document 1 discloses an incised prepreg in which continuous reinforcing fibers aligned unidirectionally are impregnated with a resin in a unidirectional prepreg, and incisions that divide the reinforcing fibers are provided to improve a shape followability during molding.

Further, Patent Document 2 discloses a prepreg in which the reinforcing fibers are made of discontinuous fibers and considered as a molding material which is dispersed in multiple directions, and the prepreg has an excellent balance between the followability to a complicated shape and the mechanical properties of the molded article during molding.

Furthermore, Patent Document 3 discloses a technique that defines a ratio between a deformation amount in an in-plane direction that occurs when a molded base material is pressurized and a deformation amount in an out-of-plane direction that occurs when the molded base material is depressurized after pressurization, and achieves both mechanical properties of the molded article and the followability to a complicated shape during molding.

As one method for realizing lightweight of the molded article, Patent Document 4 discloses that a core material having a low specific gravity is used.

However, the core material having the low specific gravity tends to be inferior in mechanical properties as a single material. Therefore, in a case of using such a core material, in order to ensure the mechanical properties of the molded article, Patent Document 5 discloses that a product design such as disposing a highly rigid skin material on an outer periphery of the core material is performed. However, in a product designed in this way, a mass inevitably increases or a thickness must increase. In other words, as a result, even when the lightweight of the product can be realized, the extent becomes relatively small. Further, since the skin material used for ensuring the mechanical properties of the molded article generally has a poor shape followability to a complicated shape, there is a limit to the shapes that can be molded.

PATENT DOCUMENTS

Patent Document 1: Japanese Patent Laid-open Publication No. 2008-207544
Patent Document 2: Japanese Patent Laid-open Publication No. 2010-235779
Patent Document 3: WO 2019/189384 A
Patent Document 4: WO 2017/110528 A
Patent Document 5: WO 2015/029634 A

SUMMARY OF THE INVENTION

The fiber-reinforced plastic used for industrial products are required to have irregularities such as a boss and rib shape, a deep-drawn portion, and a thickness change portion in order to improve the mechanical properties and functionality, and a molding material is required to have the followability to a complicated shape. However, in the invention described in Patent Document 1, since an orientation direction of fibers is unidirectional, anisotropy exists in the shape followability, and the shapes that can be molded is limited. Further, since the mechanical properties of the resulting reinforcing fiber plastics also have anisotropy, it is necessary to design the orientation direction of the fibers for lamination.

In the invention described in Patent Document 2, although the reinforcing fibers are discontinuous and thus have a certain shape followability, when the discontinuous fibers are oriented in multiple directions, fibers having different orientation directions interfere with each other, and thus the invention is not sufficient for use in molding involving large deformation.

Further, in the invention described in Patent Document 3, although it is easy to mold a complicated shape due to an in-plane deformation and an out-of-plane deformation, there is a limitation on the shapes that can be molded, and it is difficult to mold a desired shape.

Furthermore, in the method for manufacturing a structure described in Patent Document 4 or Patent Document 5, there is a limit to the shape followability during molding, and there is a case where it is difficult to mold a complicated shape.

From the matters above, there is a demand for a fiber-reinforced plastic material having high mechanical properties and also having the followability to a complicated shape and lightweight properties. The present invention has been made in view of the problems above, and an object of the present invention is to provide a fiber-reinforced plastic material capable of simultaneously achieving high mechanical properties of the molded article, the followability to a complicated shape during molding, and lightweight properties of the molded article.

One aspect of the present invention for solving the problems above is a thermoplastic prepreg obtained by impregnating a discontinuous reinforcing fiber web with a thermoplastic resin, the thermoplastic prepreg satisfying at least one of the following features (A) or (B):

feature (A), that is, a plurality of incisions cutting at least a part of discontinuous reinforcing fibers constituting the discontinuous reinforcing fiber web is included; and feature (B), that is, a fiber length variation region in which a coefficient of variation in fiber length of discontinuous reinforcing fibers constituting the discontinuous reinforcing fiber web is 40% or more is included.

Further, another aspect of the present invention, which is typically understood as a fiber-reinforced plastic obtained by molding the thermoplastic prepreg, is a fiber-reinforced plastic having a thermoplastic resin layer containing discontinuous reinforcing fibers and a thermoplastic resin, the fiber-reinforced plastic satisfying at least one of the following features (C) or (D):

feature (C), that is, the thermoplastic resin layer has an end portion arrangement structure in which end portions of the discontinuous reinforcing fibers oriented in three or more directions are continuously arranged; and feature (D), that is, the thermoplastic resin layer has a fiber length variation portion in which a coefficient of variation in fiber length of the discontinuous reinforcing fibers contained in the thermoplastic resin layer is 40% or more.

Furthermore, a method for producing a thermoplastic prepreg as described above and a method for producing a fiber-reinforced plastic using the thermoplastic prepreg of the present invention are also understood as one aspect of the present invention.

According to the present invention, it is possible to obtain a thermoplastic prepreg which has a high followability to a complicated shape and can exhibit high mechanical properties, and thereby it is possible to obtain a fiber-reinforced plastic which has high surface quality even in the complicated shape and has high mechanical properties and lightweight properties.

BRIEF DESCRIPTION OF THE DRAWINGS

FIG. 1 is a schematic view showing one example of a thermoplastic prepreg of the present invention.

FIG. 2 is a schematic view showing one example of a cross-section in a thickness direction of the thermoplastic prepreg of the present invention.

FIG. 3 is a schematic view showing one example of arrangement of cuts in the thermoplastic prepreg of the present invention.

FIG. 4 is one example of a histogram showing a typical fiber length distribution in a fiber length variation region of the thermoplastic prepreg of the present invention or a fiber length variation portion of a fiber-reinforced plastic.

FIG. 5 is a schematic view showing one example of an orientation state of reinforcing fibers in the thermoplastic prepreg of the present invention.

FIG. 6 is a schematic view showing one example of an end portion arrangement structure in which the fiber-reinforced plastic of the present invention is continuously arranged.

FIG. 7 is a schematic view showing one example of an embodiment of the present invention.

FIG. 8 is a schematic view for supplementing the description of moldability tests.

DETAILED DESCRIPTION OF EMBODIMENTS OF THE INVENTION

<Thermoplastic Prepreg>

A thermoplastic prepreg (hereinafter, it may be simply referred to as a "prepreg") of the present invention is a thermoplastic prepreg obtained by impregnating a discontinuous reinforcing fiber web with a thermoplastic resin, and satisfies at least one of the following features (A) or (B):

feature (A), that is, a plurality of incisions cutting at least a part of discontinuous reinforcing fibers constituting the discontinuous reinforcing fiber web is included; and feature (B), that is, a fiber length variation region in which a coefficient of variation in fiber length of the discontinuous reinforcing fibers constituting the discontinuous reinforcing fiber web is 40% or more is included.

The discontinuous reinforcing fiber web is an aggregate of discontinuous reinforcing fibers, and has at least a portion where the discontinuous reinforcing fibers constituting the aggregate are in direct contact with each other or a portion where the discontinuous reinforcing fibers constituting the aggregate are bonded to each other via a binder resin to be described later.

The reinforcing fibers used as the discontinuous reinforcing fibers (hereinafter, it may be simply referred to as the "reinforcing fibers") are not particularly limited, and for example, carbon fibers, glass fibers, aramid fibers, alumina fibers, silicon carbide fibers, boron fibers, metal fibers, natural fibers, mineral fibers and more can be used, and two or more of these may be used in combination. Among them, PAN-based, pitch-based, and rayon-based carbon fibers are preferably used from viewpoints of a high specific strength, a high specific rigidity, and a lightweight effect. Further, from a viewpoint of enhancing economical efficiency of the obtained molded article, the glass fibers can be preferably used. From a viewpoint of a balance between the mechanical properties and economic efficiency, it is also a preferable aspect to use the carbon fibers and the glass fibers in combination. Furthermore, the aramid fibers can be preferably used from a viewpoint of enhancing an impact absorbability as well as a draping property of the obtained molded article. From the viewpoint of a balance between the mechanical properties and impact absorbability, it is also a preferable aspect to use the carbon fibers and the aramid fibers in combination. Alternatively, reinforcing fibers coated with a metal such as nickel, copper, or ytterbium can also be used from a viewpoint of improving the conductivity of the obtained molded article.

The reinforcing fibers contained in the thermoplastic prepreg of the present invention are discontinuous reinforcing fibers. Since the reinforcing fibers contained in the prepreg are discontinuous, it is easy to produce a fiber-reinforced plastic having an excellent shape followability and a complicated shape. In the present description, the discontinuous reinforcing fibers mean reinforcing fibers having an average fiber length of 100 mm or less. The average fiber length of the discontinuous reinforcing fibers is preferably within a range of 2 mm or more and 20 mm or less. Within this range, it is possible to achieve an excellent balance between the mechanical properties and the shape followability.

Examples of the method for measuring the fiber length of reinforcing fibers include a method of directly extracting the reinforcing fibers from the discontinuous reinforcing fiber web and measuring the fiber length, and a method of dissolving only a thermoplastic resin in a prepreg or in a fiber-reinforced plastic after molding, separating the remaining reinforcing fibers by filtration, and measuring the fiber length by microscopic observation (a dissolution method). Further, in a case where a solvent that dissolves the thermoplastic resin is absent, there is a method in which only the thermoplastic resin is burned off in a temperature range in which an amount of oxidation of the reinforcing fibers is not reduced, and the reinforcing fibers are separated and measured by microscopic observation (a burning off method). By such a method, 100 single fibers of discontinuous reinforcing fibers are randomly extracted from the prepreg or the fiber-reinforced plastic after molding, the length of each fiber is measured to the order of 1 μm with an optical microscope, and an average value is taken as the average fiber length. In addition, in a case where a method of directly extracting the reinforcing fibers from the discontinuous reinforcing fiber web is compared with a method of extracting the reinforcing fibers by the burning off method or the dissolution method, there is no significant difference in the obtained results by appropriately selecting conditions. However, in the present invention, in a case where the average fiber length and the coefficient of variation thereof calculated from the fiber length extracted and measured by any of the methods fall within the numerical range mentioned above, the conditions mentioned above are satisfied. In addition, when selecting conditions, in the dissolution method, it is possible to select an appropriate condition by selecting a solvent after confirming in advance whether the solvent to be used can dissolve the thermoplastic resin, the time required for dissolution, and a required amount of the solvent, and in the burning off method, it is possible to set an appropriate condition after confirming in advance a thermal decomposition temperature of the thermoplastic resin, the required time, and more.

The discontinuous reinforcing fiber web is preferably a nonwoven fabric obtained by a dry method or a wet method. In the nonwoven fabric obtained by the dry method or the wet method, it is easy to randomly disperse the discontinuous reinforcing fibers, and as a result, a prepreg having isotropic mechanical properties and moldability can be obtained.

In the discontinuous reinforcing fiber web, the reinforcing fibers may be sealed with other components such as the binder resin. The binder resin is preferably selected from a thermoplastic resin and a thermosetting resin from a viewpoint of an adhesiveness between the resin and the reinforcing fibers, sealing only the reinforcing fibers, and ensuring the handleability. From the viewpoint of adhesiveness between the resin and the reinforcing fibers, the same type resin as the thermoplastic resin or a resin having compatibility is selected, and from the viewpoint of ensuring the handleability of the reinforcing fibers, an aqueous solution, dispersion, or emulsion of a thermosetting resin or thermoplastic resin is preferably selected.

The discontinuous reinforcing fibers contained in such a discontinuous reinforcing fiber web are usually oriented in three or more directions in a plane. Such an aspect has the shape followability during molding and isotropy having high mechanical properties when formed into a fiber-reinforced plastic. Further, generally in a case of a prepreg in which the reinforcing fibers are aligned unidirectionally (hereinafter referred to as unidirectional prepreg), a step of laminating a plurality of unidirectional prepregs is required in order to exhibit a desired shape followability and mechanical properties, and the number of laminated sheets (that is, the thickness of the molded article) may be limited in order to obtain a pseudo isotropy. On the other hand, as in the thermoplastic prepreg of the present invention, by orienting the reinforcing fibers in three or more directions in a plane, it is possible to save time and effort for laminating the prepregs and to obtain the isotropy in an arbitrary number of laminated sheets.

A method for confirming that the reinforcing fibers are oriented in three or more directions in a plane is shown below. One single fiber is selected from discontinuous reinforcing fibers contained in the prepreg, and the orientation direction of the discontinuous reinforcing fiber in the plane of the prepreg (a direction of a straight line connecting both ends of the discontinuous reinforcing fiber) is defined as a 0° direction. Here, "in the plane" of the prepreg means that a determination is made on a plane projected onto another plane parallel to a discontinuous reinforcing fiber prepreg. At this time, when another discontinuous reinforcing fiber crossing the discontinuous reinforcing fiber at an angle of 10° or more in the plane is present on both the clockwise side and the counterclockwise side based on 0°, the reinforcing fiber is considered to be oriented in three or more directions in the plane in the present invention. In addition, the term "crossing" as used herein does not necessarily mean that two single fibers of target discontinuous reinforcing fibers overlap with each other in the thickness direction, and includes a case where extended lines obtained by extending the respective discontinuous reinforcing fibers in the orientation direction cross each other.

As a method for measuring the orientation state of the reinforcing fibers, for example, a method of observing the orientation of the reinforcing fibers from a surface of the prepreg can be exemplified. In this case, the reinforcing fibers can be more easily observed by polishing the surface of the prepreg to expose the fibers. Further, a method of observing the orientation of the reinforcing fibers using transmitted light in the prepreg can also be exemplified. In this case, the reinforcing fibers can be more easily observed by thinly slicing the prepreg. Furthermore, a method of performing transmission observation of the prepreg by X-ray CT to photograph an orientation image of the reinforcing fibers can also be exemplified. For the reinforcing fibers having a high X-ray transmissivity, fibers for a tracer are mixed into the reinforcing fibers, or a chemical for a tracer is applied to the reinforcing fibers, whereby the reinforcing fibers become easier to be observed.

Examples the thermoplastic resin impregnated in the discontinuous reinforcing fiber web which is used in the prepreg of the present invention can be a thermoplastic resin selected from crystalline resins such as "polyesters like polyethylene terephthalate (PET), polybutylene terephthalate (PBT), polytrimethylene terephthalate (PTT), polyethylene naphthalate (PEN), liquid crystal polyesters, and more; polyolefins like polyethylene (PE), polypropylene (PP), polybutylene, and more; polyarylene sulfides like polyoxymethylene (POM), polyamide (PA), polyphenylene sulfide (PPS), and more; fluorine-based resins like polyketone (PK), polyether ketone (PEK), polyether ether ketone (PEEK), polyether ketone (PEKK), polyether nitrile (PEN), polytetrafluoroethylene, and more; liquid crystal polymer (LCP)"; amorphous resins such as "in addition to styrene-based resins, polycarbonate (PC), polymethyl methacrylate (PMMA), polyvinyl chloride (PVC), polyphenylene ether (PPE), polyimide (PI), polyamideimide (PAI), polyetherimide (PEI), polysulfone (PSU), polyether sulfone, and polyarylate (PAR)", and more; additionally, thermoplastic elastomers like phenol-based resins, phenoxy resins, and further, polystyrene-based, polyolefin-based, polyurethane-based, polyester-based, polyamide-based, polybutadiene-based, polyisoprene-based, and fluorine-based resins, acrylonitrilebased, and more; or copolymers and modified products thereof. Among these, the polyolefin is preferable from a viewpoint of lightweight properties of the obtained molded article, the polyamide is preferable from a viewpoint of strength, the amorphous resins like the polycarbonate and the styrene-based resin are preferable from a viewpoint of surface quality, the polyarylene sulfide is preferable from a viewpoint of heat resistance, the polyether ether ketone is preferable from a viewpoint of continuous use temperature, and the fluorine-based resin is preferably used from a viewpoint of chemical resistance.

As the thermoplastic resin, a blend resin containing a plurality of types of the thermoplastic resins may be used, and a blend resin mixed with a thermosetting resin may be used as long as a main component of the thermoplastic resin matrix (a component exceeding 50 wt % when the entire matrix is 100 wt %) is a thermoplastic resin.

The thermoplastic prepreg of the present invention preferably contains 40 wt % or more and 90 wt % or less of the thermoplastic resin and 10 wt % or more and 60 wt % or less of the discontinuous reinforcing fibers. Such an aspect is preferable because it is excellent in the balance between the shape followability and the mechanical properties. A weight ratio of each of the thermoplastic resin and the discontinuous reinforcing fibers is not particularly limited as long as it is within the range above, but it is preferable that the thermoplastic resin is contained in an amount of 50 wt % or more and 80 wt % or less and the discontinuous reinforcing fibers are contained in an amount of 20 wt % or more and 50 wt % or less in a case where a balance between the shape followability and the mechanical properties is emphasized, it is preferable that the thermoplastic resin is contained in an amount of 60 wt % or more and 90 wt % or less and the discontinuous reinforcing fibers are contained in an amount of 10 wt % or more and 40 wt % or less in a case where the shape followability is emphasized, and it is preferable that the thermoplastic resin is contained in an amount of 40 wt % or more and 70 wt % or less and the discontinuous reinforcing fibers are contained in an amount of 30 wt % or more and 60 wt % or less in a case where mechanical properties are emphasized.

As a first aspect, the thermoplastic prepreg of the present invention has an aspect satisfying the feature (A), that is, the thermoplastic prepreg has a plurality of incisions that cut at least a part of the discontinuous reinforcing fibers constituting the discontinuous reinforcing fiber web. The incisions further shorten the fiber length of some of the reinforcing fibers, and the incised end portions of the reinforcing fibers are arranged in a straight line or a curved line, so that the reinforcing fibers do not stretch and the incisions are opened during molding of a complicated shape. Further, since the reinforcing fibers are divided by the incisions, transmission of interference between the reinforcing fibers is interrupted, and it is easy to follow a complicated shape.

Hereinafter, in order to facilitate understanding, the present invention will be described with reference to the drawings as appropriate, but the present invention is not limited by these drawings at all. Further, the description of the specific embodiment shown in the drawings can also be understood as a description of the thermoplastic prepreg of the present invention as a superordinate concept.

In the embodiment shown in FIG. 1, the thermoplastic prepreg 3 has an incision 1 that cuts at least a part of the discontinuous reinforcing fibers. The incision may be provided over the entire surface of the thermoplastic prepreg, or may be provided only in a part thereof. Further, when the incision does not penetrate in the thickness direction of the discontinuous reinforcing fiber web, the incision may be provided on both surfaces or may be provided only on one surface. In the present description, a region where the incision is provided in the surface of the thermoplastic prepreg is referred to as "incised regions". As illustrated in FIG. 1, a boundary of an incised region 2 is defined by a line segment group linking line segments connecting the end portions of the incision present on the outermost side of the region. Such a line segment group is drawn such that all incisions are included in the line segment group and a total length of the line segment group is minimized. In other words, in the thermoplastic prepreg of the present invention, the entire surface may be an incised region, or an incised region may be provided in a part of the surface. In addition, in FIG. 1, the incised region is only one region provided in the range illustrated in (a), but a plurality of regions may be provided. In a case where the incised regions are adjacent to each other, when it is determined whether the incised regions are a plurality of incised regions or one large incised region, to start with, in a case where it is assumed that the incised regions are two adjacent incised regions, an average distance of incisions in each of the adjacent incised regions is obtained, and if any one of the average distances is shorter than the endmost distance between the two regions assumed to be adjacent, the assumption is made to be correct, and the two regions are set.

The shape of the incisions is not particularly limited, and may be a linear shape, a shape having a polygonal line portion, or a shape having a curved portion partially or entirely, but the incisions are preferably a linear shape in order to stably provide the incisions.

The length of the incisions is not particularly limited, but is preferably 0.1 mm or more, and more preferably 0.5 mm or more in order to facilitate openings of the incisions during molding. On the other hand, in order to have sufficient mechanical properties when the thermoplastic prepreg of the present invention is molded into a fiber-reinforced plastic, the length of the incisions is preferably 50 mm or less, and more preferably 10 mm or less. In addition, the length of the target incision refers to a length along the incision from one end portion to the other end portion of the target incision. In addition, when the length of the incision changes in the thickness direction of the prepreg, the length along the incision from one end portion to the other end portion of the incision on a prepreg surface is defined as the length of the incision.

The incision is preferably an incision reaching a depth of 50% or more and 100% or less in the thickness direction of the discontinuous reinforcing fiber web. By adopting such an aspect, the incision is easily opened during molding, and a high shape followability is exhibited. The incision depths may be the same for all the incisions or may be different for each incision, but from a viewpoint of easily controlling the shape followability, it is more preferable that all the incisions have the same incision depth. Here, the depth at which the incisions reach will be described with reference to FIG. 2. FIG. 2 is a schematic view of a cross section of the thermoplastic prepreg parallel to the thickness direction including the incisions. The incision depths refer to a distance 8 in the thickness direction from a surface 5 on a side where the incision 1 is inserted to a tip 7 of the incision in a discontinuous reinforcing fiber web 4. In the present description, the cross section in the thickness direction of the prepreg and having ten or more incision exposed on the cross section is observed, ten incisions are arbitrarily extracted from the incisions included in the cross section, the incision depths are measured, and an average value of the depths of the extracted ten incisions is taken as the incision depth. Further, the thickness of the discontinuous reinforcing fiber web is an average value of distances between the surfaces of ten portions measured by measuring a distance 9 between both surfaces of the discontinuous reinforcing fiber web near the incisions where the incision depths of the cross section are measured. A depth 8 of the incisions when the incision 1 penetrates the discontinuous reinforcing fiber web 4 is equal to the thickness 9 of the discontinuous reinforcing fiber web. A ratio of the incision depth is calculated as (average value of incision depth)/(average value of thickness of discontinuous reinforcing fiber web)×100(%).

In the incised region, the incisions are preferably arranged regularly. With such an aspect, it is possible to exhibit a homogeneous shape followability, and it is possible to suppress a large-scale breakage that occurs when the incisions are connected to each other during molding. In addition, the phrase "the incisions are regularly arranged" refers to a case where 90% or more of the area of the incised region 2 of the thermoplastic prepreg is arranged with incision units 10 including two or more incisions 1 laid out, as described with reference to FIG. 3.

In the incised region, it is preferable that intervals between adjacent incisions are all constant, and lengths of all incisions are constant. The adjacent incisions refer to incisions that are different from any one of the incisions and have the shortest interval between the respective incisions. The intervals between the incisions refers to a distance between points (midpoints of the incisions) that bisect the length of each incision along the incisions. It is preferable that the intervals between the adjacent incisions included in one incised region are all constant, and the lengths of all incisions are constant, because a thermoplastic prepreg having a homogeneous property in the incised region can be obtained.

A sum of the incision lengths converted per 1 m$^2$ in the incised region is preferably 40 m or more. Such an aspect greatly improves the shape followability of the prepreg. More preferably, the sum of the incision lengths converted per 1 m$^2$ is 100 m or more, and more preferably 200 m or more. An upper limit of the sum of the incision lengths is not particularly limited, but is preferably 1000 m or less in order to prevent the prepreg from being largely ruptured during molding. When the sum of the incision lengths is converted, the sum of the incision lengths exposed on the front surface and the back surface of the prepreg having an area of at least 0.01 m$^2$ or more in the incised region 2 is calculated, and the calculated value is converted into the sum of the incision lengths per 1 m$^2$. When the sum of the incision lengths is different between the front surface and the back surface, the larger value is adopted as the sum of the incision lengths. For example, in a prepreg in which the area of the incised region 2 on both front and back surfaces is 0.01 m$^2$, in a case where the sum of the incision lengths on one surface is 0.5 m and the sum of the incision lengths on the other surface is 1 m, the sum of the incision lengths converted per 1 m$^2$ is 100 m.

The sum of the incision lengths converted per 1 m$^2$ in the incised region is more preferably 40 m or more and 500 m or less. With such an aspect, it is possible to maintain the high shape followability in the in-plane direction while exhibiting the high shape followability in the out-of-plane direction of the prepreg, and the balance of shape followability in each direction is excellent.

As a second aspect, the thermoplastic prepreg of the present invention may have an aspect satisfying the feature (B), that is, the thermoplastic prepreg has a fiber length variation region in which the coefficient of variation in fiber length of the discontinuous reinforcing fibers constituting the discontinuous reinforcing fiber web is 40% or more. The coefficient of variation is a value calculated by standard deviation/average value×100. The discontinuous reinforcing fibers having a wide fiber length distribution are present in the fiber length variation region, and as a result, the fiber length variation region of the prepreg can have the excellent shape followability.

The coefficient of variation of the fiber length in the fiber length variation region is preferably 50% or more, and more preferably 60% or more. In order to exhibit the shape followability and the mechanical properties in a well-balanced manner, the coefficient of variation is preferably 200% or less. On the other hand, when the coefficient of variation in fiber length is less than 40%, it may be difficult to achieve both the mechanical properties and the shape followability. Since the thermoplastic prepreg of the present invention has the high shape followability due to the fiber length variation region, a fiber-reinforced plastic excellent in the mechanical properties and lightweight properties can be obtained while having a complicated shape.

In the present invention, the fiber length variation region may be present in at least a part of the prepreg. Specifically, when the prepreg is divided into a grid composed of square elements of 50 mm×50 mm square in a plan view, the coefficient of variation in fiber length in one or more of the elements may be 40% or more. Further, in the present invention, a set of elements having a coefficient of variation of fiber length of 40% or more when divided in this way is referred to as a "fiber length variation region". The ratio of the fiber length variation region in the prepreg is not particularly limited, and should be appropriately designed according to the shape of the molded article or the like. In the present invention, the entire prepreg may be formed by the fiber length variation region. In addition, when the size of the target prepreg is less than a grid size, the entire prepreg is regarded as one element.

In the prepreg of the present invention, when a histogram showing a fiber length distribution of the discontinuous reinforcing fibers is created under the following conditions in the fiber length variation region, the highest frequency is preferably 70% or less.

Condition: lengths of discontinuous reinforcing fibers randomly selected from the discontinuous reinforcing fibers included in a fiber length variation region are measured, and a range from a minimum fiber length to a maximum fiber length is equally divided into nine, thereby creating a histogram with a grade number of 9. The frequency is a ratio [%] of the number of single fibers of discontinuous reinforcing fibers belonging to each grade when the number of all single fibers of the discontinuous reinforcing fibers randomly selected is taken as 100%.

Here, the above conditions will be described in detail with reference to FIG. 4. FIG. 4 is a diagram schematically showing a typical fiber length distribution histogram of discontinuous reinforcing fibers included in a fiber length variation region. In FIG. 4, a vertical axis represents frequency, and a horizontal axis represents the fiber length of the discontinuous reinforcing fibers. A histogram having a grade number of 9 is created from the fiber lengths of 100 single fibers of reinforcing fibers randomly measured according to the method for measuring the average fiber length of the reinforcing fibers described above. The number of ranks is set to 9 by equally dividing the range from the minimum fiber length to the maximum fiber length among the measured 100 single fibers of fibers into nine. Further, the fibers are referred to as a first grade, a second grade, a third grade, . . . , and a ninth grade in order from a grade with a shorter fiber length. For example, in a case where the minimum fiber length is 1.0 mm and the maximum fiber length is 19.0 mm among the measured 100 single fibers of fiber lengths, the first grade is 1.0 mm or more and less than 3.0 mm, the second grade is 3.0 mm or more and less than 5.0 mm, the third grade is 5.0 mm or more and less than 7.0 mm, the fourth grade is 7.0 mm or more and less than 9.0 mm, the fifth grade is 9.0 mm or more and less than 11.0 mm, the sixth grade is 11.0 mm or more and less than 13.0 mm, the seventh grade is 13.0 mm or more and less than 15.0 mm, the eighth grade is 15.0 mm or more and less than 17.0 mm, and the ninth grade is 17.0 mm or more and 19.0 mm or less. In this histogram, the frequency is a ratio [%] of the number of single fibers of discontinuous reinforcing fibers belonging to each grade when the number of all single fibers of the discontinuous reinforcing fibers randomly selected is taken as 100%.

In the histogram, the grade 12 having a fiber length longer than that of the grade 11 having the highest frequency is formed of discontinuous reinforcing fibers having a relatively long fiber length among the discontinuous reinforcing fibers contained in the prepreg of the present invention, and thus they are collectively referred to as a long fiber grade group 13. On the other hand, since the grade 11 having the highest frequency and the grade 14 having a shorter fiber length than the grade 11 are formed of discontinuous reinforcing fibers having a relatively short fiber length, they are collectively referred to as a short fiber grade group 15. The discontinuous reinforcing fibers belonging to the long fiber grade group 13 have an effect of exhibiting high mechanical properties while being lightweight when being formed into a fiber-reinforced plastic using the prepreg of the present invention. On the other hand, when the discontinuous reinforcing fibers belonging to the short fiber grade group 15 are made into a fiber-reinforced plastic using the prepreg of the present invention, the high followability to a complicated shape and a high dimensional accuracy can be exhibited. In addition, in determining the grade having the highest frequency, when there is a plurality of grades having the same frequency, the grade having the longer fiber length among the grades is adopted.

In the fiber length variation region, the highest frequency in the histogram is preferably 70% or less. This makes it possible to obtain a fiber-reinforced plastic which is excellent in the balance between the fiber lengths of the discontinuous reinforcing fibers and has both the mechanical properties and the shape followability. A more preferable range of the highest frequency in the histogram is 60% or less, and more preferably 50% or less.

Further, in the fiber length variation region, it is more preferable that there are three or more grades having a frequency of 10% or more in the histogram. This means that the fiber length of the discontinuous reinforcing fibers is distributed over a wide range, and as a result, both the shape followability and the mechanical properties are more easily achieved. A more preferable number of grades having a frequency of 10% or more is 4 or more, and more preferably 5 or more.

The thermoplastic prepreg of the present invention satisfies at least one of the feature (A) or the feature (B). When both the feature (A) and the feature (B) are satisfied, the fiber-reinforced plastic is excellent in the shape followability in both the in-plane direction and the out-of-plane direction, and the fiber-reinforced plastic to be molded exhibits excellent mechanical properties, which is more preferable.

The thermoplastic prepreg of the present invention is expanded by a raising force of the discontinuous reinforcing fibers by being heated to a temperature equal to or higher than a temperature at which the thermoplastic resin is melted or softened. In particular, when the thickness of a precursor obtained by cutting out only the incised region or the fiber length variation region from the thermoplastic prepreg of the present invention is denoted by R [mm], and the thickness of a fiber-reinforced plastic obtained by heating the precursor to a temperature equal to or higher than a temperature at which the thermoplastic resin is melted or softened and then holding the precursor under atmospheric pressure for one hour is denoted by S [mm], an expansion ratio determined by S/R is preferably 2.0 or more from a viewpoint of the followability to a complicated shape and the lightweight properties when the precursor is a fiber-reinforced plastic. The expansion ratio is more preferably 3.0 or more, and more preferably 5.0 or more.

It is more preferable that the thermoplastic prepreg of the present invention satisfies the features (A) and (B), and a plurality of incisions for cutting at least a part of the reinforcing fibers contained in the discontinuous reinforcing fiber web is formed in the fiber length variation region. The fiber lengths of a part of the reinforcing fibers are shortened by the cutting, a variation state of the fiber lengths of the discontinuous reinforcing fibers can be easily formed, and the end portions of the incised reinforcing fibers are arranged in a straight line or a curved line, so that the reinforcing fibers are not stretched but the incision is opened during molding of a complicated shape. Further, since the reinforcing fibers are divided by the incisions, transmission of interference between the reinforcing fibers is interrupted, and it is easy to follow a complicated shape. As the incisions formed in the fiber length variation region, incisions in the same aspect as the incisions described above can be used. Such an aspect is excellent in the shape followability in the in-plane direction and the out-of-plane direction, and furthermore, a fiber length variation region can be formed by an efficient means of incising and inserting, so that a thermoplastic prepreg excellent in productivity is obtained.

In the thermoplastic prepreg of the present invention, the discontinuous reinforcing fibers are preferably monofilament. When the reinforcing fibers are monofilament, the prepreg has a more homogeneous shape followability, and when molded, homogeneous mechanical properties are exhibited, stress concentration on the end portions of the reinforcing fibers is suppressed, and high mechanical properties can be exhibited. Here, the phrase "the reinforcing fibers are monofilament" refers to a state in which reinforcing fiber monofilaments are not bundled but independently dispersed in the prepreg. In the present invention, when two-dimensional orientation angles to be described later are measured for reinforcing fiber monofilaments arbitrarily selected from the prepreg and reinforcing fiber monofilaments crossing the reinforcing fiber monofilaments, if the ratio of reinforcing fiber monofilaments having a two-dimensional orientation angle of 1° or more is 80% or more, it is determined that the discontinuous reinforcing fibers are in the form of a monofilament. Here, since it is difficult to specify all the reinforcing fiber monofilaments crossing the selected reinforcing fiber monofilaments, 20 single fibers of crossing reinforcing fiber monofilaments are randomly selected, and the two-dimensional orientation angles are measured. This measurement is repeated for five times in total with another reinforcing fiber monofilament, and the ratio of monofilaments having the two-dimensional orientation angle of 1° or more is calculated.

The two-dimensional orientation angles will be described in detail with reference to FIG. 5. FIG. 5 is a schematic view showing a dispersion state of the reinforcing fibers in a case where only the reinforcing fibers are extracted from the thermoplastic prepreg of the present invention and observed from the thickness direction. Here, the case of observation from the thickness direction refers to observation of a projection image on a plane parallel to the thermoplastic prepreg. Focusing on a reinforcing fiber monofilament 16*a*, the reinforcing fiber monofilament 16*a* crosses reinforcing fiber monofilaments 16*b* to 16*f*. Here, crossing means a state in which a reinforcing fiber monofilament focused on in the observed two-dimensional plane is observed to cross another reinforcing fiber monofilament, and the reinforcing fiber monofilament 16*a* and the reinforcing fiber monofilaments 16*b* to 16*f* are not necessarily in contact with each other in the actual prepreg. The two-dimensional orientation angles are defined as an angle 17 of 0° or more and 90° or less among two angles formed by two crossing reinforcing fiber monofilaments.

Specifically, the method for measuring the average value of two-dimensional orientation angles from the thermoplastic prepreg is not particularly limited, and for example, the same method as the method for observing the orientation of reinforcing fibers from the surface of the prepreg can be exemplified.

Furthermore, in the thermoplastic prepreg of the present invention, it is preferable that the discontinuous reinforcing fibers are randomly oriented in the plane. Such an aspect exhibits an isotropic shape followability and mechanical properties. In the present invention, the state in which the reinforcing fibers are randomly oriented in the plane refers to a state in which the average value of two-dimensional orientation angles of the reinforcing fibers is in the range of 30° or more and 60° or less. The average value of the two-dimensional orientation angles is more preferably within a range of 40° or more and 50° or less, and it is more preferable as the two-dimensional orientation angles approach 45° which is an ideal angle. The average value of the two-dimensional orientation angles of the present invention is measured by calculating the average value of the two-dimensional orientation angles of all the reinforcing fiber monofilaments (the reinforcing fiber monofilaments 16*b* to 16*f* in FIG. 5) crossing the randomly selected reinforcing fiber monofilaments (the reinforcing fiber monofilament 16*a* in FIG. 5). In a case where there are a large number of reinforcing fiber monofilaments crossing the reinforcing fiber monofilaments 16*a*, 20 single fibers of crossing reinforcing fiber monofilaments are randomly selected and measured, and this measurement is repeated for 5 times in total with another reinforcing fiber monofilament, and the average value of 100 two-dimensional orientation angles is taken as the average value of two-dimensional orientation angles.

The fiber-reinforced plastic can be obtained by molding the thermoplastic prepreg as described above alone or by laminating two or more thermoplastic prepregs. In particular, when two or more thermoplastic prepregs are integrally molded, the prepregs are integrally deformed during molding, so that it is possible to prevent only a specific prepreg from being deformed and leading to a large-scale breakage, which is preferable. Further, a degree of freedom in thickness design can be provided, and a range of moldable shapes is widened. In the present invention, the aspect having two or more thermoplastic prepregs is not particularly limited, and an aspect in which the side surfaces of a plurality of thermoplastic prepregs are connected to each other and arranged in a plane may be employed, but an aspect in which the two or more thermoplastic prepregs are laminated on each other, that is, an aspect in which the thermoplastic prepregs adjacent in the thickness direction at least partially overlap each other when viewed in the thickness direction is preferable. Further, the term "integrated" refers to a state in which each thermoplastic prepreg is bonded to an adjacent thermoplastic prepreg. As a method for bonding, for example, a thermoplastic prepreg laminate may be bonded by heating the whole or a part of the thermoplastic prepreg laminate to soften the resin and then cooling the resin to solidify the resin, or an adhesive layer between prepreg layers may be provided, and the thermoplastic prepreg laminate may be bonded via a component of the adhesive layer.

Further, such a fiber-reinforced plastic may have a layer derived from a material other than the prepreg of the present invention in order to improve mechanical properties and designability.

<Method for Producing Thermoplastic Prepreg>

As one example, the thermoplastic prepreg of the present invention can be produced by a production method including steps of: producing the discontinuous reinforcing fiber web (a web production step); impregnating the discontinuous reinforcing fiber web with a thermoplastic resin (an impregnation step); and inserting a plurality of incisions so as to cut at least a part of the discontinuous reinforcing fibers contained in the discontinuous reinforcing fiber web (an incision step).

As the web preparation step, it is preferable to prepare the discontinuous reinforcing fiber web from dispersed discontinuous reinforcing fibers using, for example, a dry papermaking method or a wet papermaking method.

Examples of the impregnation step include a method of producing a laminate by alternately laminating one or more discontinuous reinforcing fiber webs and one or more thermoplastic resin sheets, softening the thermoplastic resin by raising the temperature of the laminate to a temperature equal to or higher than a melting point of the thermoplastic resin, and then impregnating voids of the discontinuous reinforcing fiber webs with the thermoplastic resin by applying pressure to form one prepreg.

Examples of the incision step include a method of manually cutting the discontinuous reinforcing fiber webs by using a cutter or a cutting machine, and a method of pressing a rotating roller having a blade disposed at a predetermined position against the discontinuous reinforcing fiber webs. The former is suitable in a case where the discontinuous reinforcing fiber web is simply incised, and the latter is suitable in a case where a large amount of the discontinuous reinforcing fiber web is prepared in consideration of production efficiency. In the case of using the rotation roller, the roller may be directly cut out and the blade may be provided at a predetermined position, but it is preferable that a flat plate is cut out on a magnet roller or the like and a sheet-like mold in which the blade is arranged at a predetermined position is wound, because replacement of the blade is facilitated.

The order of the impregnation step and the incision step may be either one first, but it is preferable to perform the incision step after the impregnation step because the reinforcing fibers are less likely to escape from the blade and a stable quality can be obtained, and the prepreg can be produced with high productivity.

<Method for Producing Fiber-Reinforced Plastic>

A molded base material containing the thermoplastic prepreg of the present invention (hereinafter, it may be simply referred to as a "molded base material") can be used in a method for producing a fiber-reinforced plastic including a heating and pressurizing step of heating a thermoplastic resin and pressurizing a molded base material containing the thermoplastic prepreg in a state where the thermoplastic resin is melted or softened. In other words, in the present description, the molded base material containing a thermoplastic prepreg is molded and referred to as "fiber-reinforced plastic". The molded base material may contain a material other than the thermoplastic prepreg of the present invention, or may be a laminate laminated with another material. The laminate may or may not be integrated, but is preferably integrated because deterioration of surface quality and mechanical properties can be prevented. As the molded base material, it is more preferable to use the prepreg laminate containing at least one thermoplastic prepreg of the present invention. Laminated surfaces of the prepreg laminates may or may not be bonded to each other, but from a viewpoint of production efficiency, the surfaces are preferably bonded to each other to integrate the prepreg laminates. The term "integrated" refers to a state in which the thermoplastic prepreg is adhered to the adjacent thermoplastic prepreg of the present invention or another base material. As a bonding method, for example, the thermoplastic prepreg laminate may be bonded by heating the whole or a part of the thermoplastic prepreg laminate, softening the thermoplastic resin, and then cooling the thermoplastic resin to solidify the thermoplastic resin, or an adhesive layer may be provided between the prepreg layers, and the thermoplastic prepreg laminate may be bonded via a component of the adhesive layer. When the other base material contains the thermosetting resin, an adhesion may be performed using tackiness of the thermosetting resin.

By having the heating and pressurizing step, the thermoplastic resin contained in the prepreg laminate is softened, and the discontinuous reinforcing fibers belonging to the short fiber grade group and the discontinuous reinforcing fibers around the incisions easily move at the time of pressurization, and easily follow the complicated shape. In order to melt or soften the thermoplastic resin, it is preferable to heat the thermoplastic resin at a temperature equal to or higher than the melting point or softening point of the thermoplastic resin. Specifically, it is preferable to heat the thermoplastic resin at a temperature higher by 10° C. or more than the melting point or softening point of the thermoplastic resin and equal to or lower than the thermal decomposition temperature of the thermoplastic resin.

The method is preferably a method for producing the reinforcing fiber plastics in which the molded base material is deformed so that a projected area of the molded base material in the thickness direction increases in the heating and pressurizing step. Here, the projected area in the thickness direction refers to a projected area projected onto a plane perpendicular to a laminating direction of the prepreg laminate. In a more specific example, in hot press molding using an upper mold and a lower mold to be described later, the projected area projected in a closing direction of the mold is the projected area in the thickness direction. In a state in which the thermoplastic resin contained in the molded base material is softened by heating the molded base material, and the incisions are opened and the molded base material is easily deformed, or in a state in which the discontinuous reinforcing fibers belonging to the short fiber grade group are easily moved, the molded base material is pressurized, and the projected area of the molded base material in the thickness direction is increased more than that before the pressurization, so that it is possible to cope with an increase in the area when the molded base material follows the irregularities of the surface of the mold, and it is possible to mold a fiber-reinforced plastic having a complicated shape. The method for measuring the projected area is not particularly limited, and examples thereof include a method in which images of the molded base material before molding and the fiber-reinforced plastic after molding are photographed at the same angle and the same magnification, and the background is removed using general image processing software to measure an area of a region of the molded base material or the fiber-reinforced plastic. More specifically, when a projected area in the thickness direction of the molded base material before pressurization is denoted by S1 and a projected area after pressurization is denoted by S2, it is preferable to pressurize the molded base material so that $S2/S1 \geq 1.6$. Such an aspect is preferable because the thermoplastic resin and the reinforcing fibers flow into the space formed by openings of the incisions, and the voids derived from the incision opening portions and surface irregularities are suppressed. A more preferable range of S2/S1 is 2.0 or more. From a viewpoint of suppressing a large rupture of the thermoplastic prepreg in the molding process, the upper limit of S2/S1 is preferably set to 10.0.

The means for heating and pressurizing the molded base material is not particularly limited, but the hot press molding using a mold is preferable because a fiber-reinforced plastic can be obtained with high productivity. Specifically, for example, there is a method in which the molded base material is disposed on a molding surface of any of the molds including the upper mold and the lower mold, the molded base material is heated to a temperature close to the molding temperature, and then the mold is closed to pressurize the molded base material, and the molded base material is deformed so as to follow a molding surface shape of the mold. In molding by hot pressing, the thickness direction coincides with the direction in which the mold moves when the molded base material is pressurized.

A heating temperature during molding is not particularly limited, but is preferably equal to or higher than the melting point or softening point of the thermoplastic resin contained in the prepreg in order to allow the molded base material to easily follow the molding surface shape of the mold.

Further, in order to obtain a fiber-reinforced plastic having a high dimensional accuracy, the method may further include a solidification step of solidifying the thermoplastic resin contained in the molded base material by lowering the temperature of the upper and lower molds while keeping the upper and lower molds closed after heating and pressurization.

The prepreg of the present invention can be used in a method for producing a fiber-reinforced plastic, the method further including: an expansion step of reducing the pressure applied in the heating and pressurizing step to a pressure equal to or lower than an expansion pressure of the molded base material caused by the raising force of the discontinuous reinforcing fibers; and a solidification step of cooling the molded base material and solidifying the thermoplastic resin in this order.

In the method for producing fiber-reinforced plastic of the present invention, by having the expansion step, the thermoplastic prepreg of the present invention expands due to the raising force of the discontinuous reinforcing fibers, follows a complicated shape, and the density of the fiber-reinforced plastic decreases, so that a lightweight member is obtained.

Examples of the method of reducing the pressure applied in the heating and pressurizing step to a pressure equal to or lower than the expansion pressure of the molded base material caused by the raising force of the discontinuous reinforcing fibers include a method of expanding the intervals between the upper and lower molds after the heating and pressurizing step. Further, a method of expanding the molded base material by unloading the pressure after the heating and pressurizing step is also exemplified. In this case, it is possible to confirm that the pressure applied in the heating and pressurizing step is reduced to equal to or lower than the expansion pressure of the molded base material caused by the raising force of the discontinuous reinforcing fibers by confirming that the molded base material expands and the intervals between the upper and lower molds increase after unloading of the pressure.

In the method for producing the fiber-reinforced plastic of the present invention, by including the solidification step, the shape of the molded base material expanded in the expansion step can be fixed, and the fiber-reinforced plastic which is lightweight and has high mechanical properties while having a complicated shape is obtained. The operation performed in the solidification step is not limited as long as the shape of the molded base material expanded in the expansion step can be fixed, but specific examples thereof include a method of cooling the thermoplastic resin contained in the molded base material expanded in the expansion step to a temperature equal to or lower than the melting point or the softening point.

Further, between the expansion step and the solidification step, a thickness adjustment step of applying a pressure to the molded base material again after the expansion step is performed to obtain a desired thickness may be further included.

As a more preferred aspect of the method for producing a fiber-reinforced plastic of the present invention, there is a production method using, as the thermoplastic prepreg, a thermoplastic prepreg that satisfies the feature (A) and satisfies $5 \leq X/Y \leq 100$, where X[m] is a sum of incision lengths in an incised region where the incisions are formed, the incision length being converted per 1 m$^2$, and Y is a maximum expansion coefficient of the thermoplastic prepreg in a region other than the incised region the maximum expansion coefficient being determined as follows.

The maximum expansion coefficient Y, that is, a value determined by Q/P, where P [mm] is a thickness of a precursor obtained by taking out a region other than the incised region from the thermoplastic prepreg, and Q [mm] is a thickness of a fiber-reinforced plastic obtained by heating the precursor to a temperature at which the thermoplastic resin is melted or softened in the heating and pressurizing step and then holding the precursor under an atmospheric pressure for one hour.

As a specific method for measuring the maximum thermal expansion coefficient Y, for example, there is a method in which a precursor obtained by cutting out a region other than the incised region from the thermoplastic prepreg is disposed in a thermostatic chamber heated to a temperature at which the thermoplastic resin is melted or softened in the heating and pressurizing step, the precursor is held for one hour and expanded by the raising force of the discontinuous reinforcing fibers to form a fiber-reinforced plastic, then the fiber-reinforced plastic is taken out from the thermostatic chamber, a thickness Q of the fiber-reinforced plastic is measured using a caliper or a micrometer, and Q/P is calculated using a thickness P of the precursor before expansion measured in advance.

X is an index representing the amount of the incisions formed in the incised region, and the shape followability tends to be improved as the value is larger. Y is an index indicating an expandability of the prepreg, and the larger the value, the more excellent the expandability tends to be. When a surface area increases at the time of following the shape, the amount of the base material per unit area decreases, and the expandability tends to decrease. In other words, the shape followability and the expandability tend to be trade-off, and when X is too large with respect to Y in X and Y, which are indexes of the shape followability and the expandability, it is difficult to obtain a fiber-reinforced plastic having a complicated shape and a light weight. On the other hand, when X is too small with respect to Y, the fiber-reinforced plastic sufficiently expands but is poor in the shape followability, and it is also difficult to obtain a fiber-reinforced plastic having a complicated shape. A more preferable range of X/Y in the incised region is $10 \leq X/Y \leq 80$, and more preferably $20 \leq X/Y \leq 60$.

<Fiber-Reinforced Plastic>

The fiber-reinforced plastic obtained by molding the thermoplastic prepreg of the present invention typically has the following characteristics. In other words, the present invention provides a fiber-reinforced plastic having a thermoplastic resin layer containing discontinuous reinforcing fibers and a thermoplastic resin, the fiber-reinforced plastic satisfying at least one of the following features (C) or (D):

feature (C), that is, the thermoplastic resin layer has an end portion arrangement structure in which end portions of the discontinuous reinforcing fibers oriented in three or more directions are continuously arranged; and feature (D), that is, the thermoplastic resin layer has a fiber length variation portion in which a coefficient of variation in fiber length of the discontinuous reinforcing fibers contained in the thermoplastic resin layer is 40% or more.

The end portion arrangement structure is derived from the incisions provided in the thermoplastic prepreg of the present invention, and since the end portion arrangement structure is present in a complicated shape portion of the fiber-reinforced plastic, the reinforcing fibers are not stretched, wrinkles and disturbance of the fibers are suppressed, and thus the surface quality is excellent.

The fiber length variation portion is derived from the fiber length variation region of the thermoplastic prepreg of the present invention, and since the fiber length variation portion is present in the complicated shape portion of the fiber-reinforced plastic, the reinforcing fibers share a role according to the fiber length, and are excellent in the shape followability and mechanical properties.

The thermoplastic resin layer may be present in at least a part of the fiber-reinforced plastic, and is particularly preferably present in a portion having a complicated shape. In addition, in the present invention, the thermoplastic resin layer is also considered to be present when the fiber-reinforced plastic is formed by molding the thermoplastic prepreg single layer of the present invention.

In the thermoplastic resin layer, when the expansion step is not performed during molding the fiber-reinforced plastic, it is preferable that a total volume content of the discontinuous reinforcing fibers and the thermoplastic resin is 90% or more because the voids contained in the fiber-reinforced plastic are small and the mechanical properties are excellent. The total volume content of the discontinuous reinforcing fibers and the thermoplastic resin is more preferably 95% or more.

Here, the end portion arrangement structure will be described in detail with reference to FIG. 6. FIG. 6 is a schematic view of a periphery of the end portion arrangement structure in the fiber-reinforced plastic of the present invention. The state in which the end portions of the reinforcing fibers are arranged means a state in which a distance between the end portions of two reinforcing fiber monofilaments is 0.1 mm or less. In other words, when the end portions of a certain reinforcing fiber monofilament 18 is present in a circle 19 having a radius of 0.1 mm in the plane centered on the end portions of another reinforcing fiber monofilament 20, the end portion of a certain reinforcing fiber 18 and the end portion of another reinforcing fiber 20 are considered to be aligned. The cross section parallel to the in-plane direction of the fiber-reinforced plastic is observed using a microscope, and line segments 21 connecting the end portions of two single fibers of reinforcing fiber monofilaments oriented in different directions and arranged side by side are sequentially connected to form a line segment group 22, whereby it can be confirmed that reinforcing fiber end portions are continuously arranged. Here, when the line segment group includes five or more line segments, it is assumed that the reinforcing fiber end portions are continuously arranged. In addition, in determining the line segment connecting the end portions of the two reinforcing fiber monofilaments, when there is the plurality of end portions of another reinforcing fiber monofilament 20 arranged side by side with the end portions of the specific reinforcing fiber monofilament 18, the end portions of another reinforcing fiber monofilament 20 closest to the end portions of the specific reinforcing fiber monofilament 18 is selected, and the end portions of another reinforcing fiber monofilament 20 for which the line segment has already been set is excluded from the options.

It can be confirmed by the following method that reinforcing fiber groups are oriented in different directions in the plane. First, the cross section parallel to the in-plane direction of the fiber-reinforced plastic is observed. In addition, when the fiber-reinforced plastic has a three-dimensional shape, one flat plate portion having a flat plate shape may be selected in the fiber-reinforced plastic, and the cross section of the flat plate portion in the in-plane direction (that is, in a direction perpendicular to the laminating direction) may be observed. When the flat plate portion does not exist in the fiber-reinforced plastic, an observation region is set at an arbitrary position of the fiber-reinforced plastic, the cross section of the thermoplastic resin layer belonging to the observation region is exposed, and then a cross-sectional image taken using a camera or a microscope from a direction perpendicular to a plane where the projected area of the observation region is maximized is observed. Additionally, one single discontinuous reinforcing fiber is selected from the group of discontinuous reinforcing fibers, and an in-plane orientation direction of the discontinuous reinforcing fibers is defined as a direction of 0°. At this time, when another discontinuous reinforcing fiber crossing the discontinuous reinforcing fibers at an angle of 10° or more is present, it is determined that the discontinuous reinforcing fibers are oriented in different directions in the plane. In addition, as in a case of the thermoplastic prepreg, the term "crossing" as used herein does not necessarily mean that the two single fibers of discontinuous reinforcing fibers overlap with each other in the thickness direction, and includes a case where the extended lines obtained by extending the respective discontinuous reinforcing fibers in the orientation direction cross each other.

The fiber-reinforced plastic of the present invention preferably includes the end portion arrangement structure that satisfies the feature (C) above and in which a length of the end portion arrangement structure to be described later is shorter than the average fiber length of discontinuous reinforcing fibers contained in the thermoplastic resin layer. By having such an aspect, the surface quality is excellent while having a complicated shape, a damage caused by incising can be suppressed, and the mechanical properties are excellent. Here, the length of the end portion arrangement structure is the length of the line segment group forming one end portion arrangement structure. The length of the end portion arrangement structure is preferably shorter from the viewpoint of strength, and particularly when the length is longer than the average fiber length of the discontinuous reinforcing fibers, the damage is likely to occur from the end portions of the incisions, and the mechanical properties may be deteriorated. More preferably, the surface of the fiber-reinforced plastic has 10 or more of the end portion arrangement structures, and the average value of the lengths of 10 of the end portion arrangement structures randomly selected from the end portion arrangement structures is shorter than the average fiber length of the discontinuous reinforcing fibers contained in the thermoplastic resin layer.

Next, the fiber length variation portion will be described. In the fiber-reinforced plastic of the present invention, the fiber length variation portion may be present in at least a part of the thermoplastic resin layer. Specifically, in a case where the thermoplastic resin layer contained in the fiber-reinforced plastic is divided into regions of the thermoplastic resin layer corresponding to a grid including square elements of 50 mm×50 mm square in a plane where the projected area of the fiber-reinforced plastic is maximum when projected on the plane, the coefficient of variation in the fiber length in one or more of the regions may be 40% or more. Further, in the present invention, a set of the regions in which the fiber length variation region is 40% or more when divided in this way is referred to as the "fiber length variation portion". The ratio of the fiber length variation portion in the thermoplastic resin layer is not particularly limited, and should be appropriately designed according to the shape of the fiber-reinforced plastic or the like. In the present invention, the entire thermoplastic resin layer may be formed by the fiber length variation portion. In addition, when the target thermoplastic resin layer is less than the grid size, the entire thermoplastic resin layer is regarded as one region. The fiber length of the reinforcing fibers contained in the thermoplastic resin layer can be measured by applying the method for measuring the reinforcing fibers contained in the thermoplastic prepreg of the present invention mentioned above.

As a more preferred aspect of the present invention, it is more preferable that at least a part of the contact points where the discontinuous reinforcing fibers cross each other is bonded with the thermoplastic resin, and the discontinuous reinforcing fibers have a porous structure including vacant spaces as a portion where neither the discontinuous reinforcing fibers nor the thermoplastic resin is present.

Aspects of the thermoplastic resin and the discontinuous reinforcing fibers contained in the porous structure are the same as those of the thermoplastic prepreg of the present invention described above, and thus descriptions thereof will be omitted.

The fact that at least a part of the contact points at which the discontinuous reinforcing fibers cross each other are bonded to each other with the thermoplastic resin refers to a state in which the discontinuous reinforcing fibers crossing each other are bonded to each other with the thermoplastic resin interposed therebetween, and can be confirmed by observing the surface of the porous structure with a microscope. By having such an aspect, a network in which the discontinuous reinforcing fibers contained in the fiber-reinforced plastic of the present invention are bonded to each other with the thermoplastic resin interposed therebetween, and is excellent in the mechanical properties while being lightweight.

The inclusion of vacant spaces as a portion where neither the discontinuous reinforcing fibers nor the thermoplastic resin is present can be confirmed by cross-section observation. Specifically, in a case where a closed curve is formed by the discontinuous reinforcing fibers and the thermoplastic resin and a region where neither the discontinuous reinforcing fibers nor the thermoplastic resin is present is present inside the closed curve when the cross section of the porous structure is obtained, the cross section is polished, and then the cross section polished with a microscope is observed, the requirements are satisfied. Such an aspect provides a fiber-reinforced plastic having excellent lightweight properties.

In the porous structure of the present invention, the content of vacant spaces is preferably in a range of 10 vol % or more and 99 vol % or less. The upper limit of the content of the vacant spaces is desirably 97% by volume. In addition, in the present invention, the total volume content of the thermoplastic resin, the discontinuous reinforcing fiber, and the vacant spaces contained in the porous structure is 100%. As a method of measuring the content of vacant spaces, there are a method of acquiring a cross-sectional image of the porous structure of the present invention and calculating a total area of vacant spaces included in the cross-sectional image by dividing the total area by the area of the entire cross-sectional image, and a method of calculating the content of vacant spaces as $(V2-V1)/V2\times100$ from the volume $V1$ of the laminate before molding and the volume $V2$ of the fiber-reinforced plastic after molding.

In the fiber-reinforced plastic of the present invention, it is more preferable that the end portion arrangement structure or the fiber length variation portion is located in the complicated shape portion. Such an aspect provides a fiber-reinforced plastic having excellent dimensional accuracy of the complicated shape portion. Here, examples of the complicated shape portion include a region where the thickness changes in the fiber-reinforced plastic, a region where the surface is a curved surface, a region having a shape change in the out-of-plane direction such as a rib or a boss, and more, but are not limited thereto, and the complicated shape portion only needs to have a three-dimensional structure.

EXAMPLES

Hereinafter, the present invention will be described in more detail with reference to the examples. However, the scope of the present invention is not limited to these examples. In addition, as for the evaluation, unless otherwise specified, a number n of measurements is 1.
<Evaluation Methods>
(1) Measurement of Orientation Angle of Reinforcing Fibers in Thermoplastic Prepreg The surface of the thermoplastic prepreg was observed with a microscope, 1 single fiber of reinforcing fiber monofilament was randomly selected, and the two-dimensional orientation angle with another reinforcing fiber monofilament crossing the reinforcing fiber monofilament was measured by image observation. As the two-dimensional orientation angle, an angle (acute angle side) of 0° or more and 90° or less was adopted among the two angles formed by two reinforcing fiber monofilaments crossing each other. The number of two-dimensional orientation angles measured per reinforcing fiber monofilament selected was set to n=20. Furthermore, from a total of 20 measured two-dimensional orientation angles, it was confirmed whether or not another discontinuous reinforcing fiber crossing the orientation direction of the randomly selected reinforcing fiber monofilament at an angle of 10° or more in the plane existed on the clockwise side and the counterclockwise side, and whether or not the discontinuous reinforcing fibers were oriented in 3 or more directions was determined.

Further, the same measurement was also performed on four reinforcing fiber monofilaments different from the measurement above, and in a case where the ratio of two-dimensional orientation angle of 1° or more was 80% or more among the two-dimensional orientation angles measured on a total of 100 reinforcing fiber monofilaments, it was determined that the reinforcing fibers were monofilaments. Furthermore, in a case where the average value of the two-dimensional orientation angles measured for a total of 100 reinforcing fiber monofilaments was in the range of 30° or more and 60° or less, it was determined that the reinforcing fibers were randomly oriented.
(2) Measurement of Weight Ratio of Thermoplastic Resin and Discontinuous Reinforcing Fibers The weight of the discontinuous reinforcing fibers contained in the thermoplastic prepreg having dimensions of 100 mm×100 mm was calculated from a basis weight of the discontinuous reinforcing fiber web produced as to be described later. Further, the weight of the thermoplastic prepreg of 100 mm×100 mm was measured, and the weight of the discontinuous reinforcing fibers was subtracted therefrom to calculate the weight of the thermoplastic resin. The weight ratios of the discontinuous reinforcing fibers and the thermoplastic resin were calculated from the weights of the discontinuous reinforcing fibers and the thermoplastic resin.
(3) Measurement of Incision Depth A cross-sectional image parallel to the thickness direction of the thermoplastic prepreg was taken so that ten or more incisions were exposed in the cross section. Next, ten incisions were randomly selected from the incisions exposed in the observed cross section, each incision depth was measured, and the average value was calculated as the incision depth of the thermoplastic prepreg. Further, the distance between the surfaces of the discontinuous reinforcing fiber web was also measured near the selected ten incisions, and the average value was calculated as the thickness of the discontinuous reinforcing fiber web. After calculating (average value of depth of incision) (average value of thickness of discontinuous reinforcing fiber web)× 100[%], the result was taken as the ratio of the incision depth of the present invention. In addition, in a case where the incision penetrated the discontinuous reinforcing fiber web, the incision depth was equal to the thickness of the discontinuous reinforcing fiber web.
(4) Evaluation of Fiber Length of Reinforcing Fibers Contained in Thermoplastic Prepreg The thermoplastic prepreg having dimensions of 50 mm×50 mm was heated in air at 500° C. for 1 hour to burn off resin components. The remaining 100 single fibers of reinforcing fibers were randomly selected, the length thereof was measured to the order of 1 μm with an optical microscope, and the average value of fiber lengths was calculated as the average fiber length. Further, based on the fiber length data for 100 single fibers of fibers, the coefficient of variation in the fiber length was calculated, and a histogram with a grade number of 9 was created.
(5) Measurement of Sum of Incision Lengths The sum of the incision lengths provided in one thermoplastic prepreg used in the examples was measured and converted to a length per 1 m². The sum of the incision lengths was measured for both surfaces, and a numerical value of the surface having a large sum of the incision lengths was adopted.

(6) Measurement of Extension Rate

Using a digital camera, images of the molded base material before molding and the fiber-reinforced plastic after molding were acquired at the same magnification from the thickness direction. Next, using image processing software, the molded base material and the background other than the fiber-reinforced plastic were removed from the image, a projected area S1 of the molded base material and a projected area S2 of the fiber-reinforced plastic were measured, and the numerical value calculated in S2/S1 was taken as the extension rate.

(7) Measurement of Length of End Portion Arrangement Structure

A cross section in the in-plane direction of the fiber-reinforced plastic was observed with a microscope, and one of the reinforcing fiber end portions near the incision opening portion was selected. Next, the end portions having a distance between the end portions of 0.1 mm or less were sequentially connected by line segments to form the line segment group, and the length of the line segment group was measured to obtain the length of the end portion arrangement structure.

(8) Moldability Test 1

Two iron plates of 300 mm×300 mm were used as the upper and lower molds, the molds were heated so that the temperature of the surface was 180° C., the molded base material containing the thermoplastic prepreg was then disposed on the surface of the lower mold, the upper mold was placed on the molded base material, the molded base material was held for 30 seconds, and the upper and lower molds were closed so that a predetermined pressure described in Table 1 was applied to the molded base material. The upper and lower molds were kept closed for 5 minutes, and then cooled and unloaded to obtain the fiber-reinforced plastic.

(9) Moldability Test 2

After the upper and lower molds having the molding surface shape illustrated in FIG. 7 were heated so that the temperature of the surfaces of the molds reached 180° C., the molded base material of the present invention was disposed on the mold surface, the upper mold was placed on the molded base material and held for 30 seconds, and then the upper and lower molds were closed so that a predetermined pressure described in Table 1 was applied to the molded base material. The upper and lower molds were kept closed for 5 minutes, and then cooled and unloaded to obtain the fiber-reinforced plastic.

(10) Moldability Test 3

The upper and lower molds having an irregularity shape illustrated in FIG. 8 were heated so that the surface temperature of the molds reached 180° C., then the molded base material of the present invention was disposed on the surface of the lower mold, the upper mold was placed on the molded base material and held for 30 seconds, then the upper and lower molds were closed so that a predetermined pressure described in Table 1 was applied to the molded base material, and a heating and pressurizing step was performed. After the upper and lower molds were held for 5 minutes while being closed, a clearance between the upper and lower molds was increased by 3 mm, and the expansion step was performed. Furthermore, a mold temperature was lowered to 100° C. while maintaining the mold clearance, and the solidification step was performed. After the solidification step, the fiber-reinforced plastic was taken out from the upper and lower molds to obtain the fiber-reinforced plastic.

(11) Appearance Evaluation 1

The surface of the fiber-reinforced plastic obtained in the moldability test 1 or the moldability test 2 was visually confirmed, and a surface state was evaluated in four stages of A, B, C, and D shown below. In addition, the fiber-reinforced plastic surface has high surface quality in the order of A, B, C, and D. Further, when the extension rate of the fiber-reinforced plastic was 1.0 or less, it was considered that following of the complicated shape did not occur, and the appearance was not evaluated.

A: Opening portions of incisions were not noticeable and had a good surface quality.

B: The opening portions of incisions were observed, but the opening portions were not connected and had the good surface quality.

C: Although the opening portions of incisions were partially connected, the length of the end portion arrangement structure was less than the average fiber length.

D: The incision opening portions were connected to each other, and the end portion arrangement structure had such a large breakage that the length of the end portion arrangement structure was equal to or longer than the average fiber length.

(12) Appearance Evaluation 2

The surface of the fiber-reinforced plastic obtained in the moldability test 3 was visually confirmed, and the surface state was evaluated in the four stages of A, B, C, and D shown below. In addition, the fiber-reinforced plastic has high surface quality in the order of A, B, C, and D.

A: Following the irregularity shape, the incisions were not noticeable and good surface quality was obtained.

B: Although following the irregularity shape, the incisions were slightly visually observed.

C: Although following the irregularity shape, the incisions were easily visually observed.

D: A large breakage was observed without following the irregularities.

(13) Evaluation of Mechanical Properties

A rectangular test piece having a width of 10 mm and a length of 100 mm was cut out from the fiber-reinforced plastic obtained in the moldability test 1, a three-point bending test was performed in accordance with JIS K 7074 (1988), and a bending strength and a bending elastic modulus were measured.

(14) Measurement of Expansion Ratio

The thermoplastic prepreg was cut into a size of 50 mm×50 mm only in the incised region or only in the fiber length variation region, the thickness was measured at three points using a micrometer, and the average value thereof was defined as a thickness R of the thermoplastic prepreg before heating. Next, the thermoplastic prepreg was left standing for 1 hour in a thermostatic chamber set at an atmospheric temperature of 180° C., the thermoplastic prepreg was expanded, the thickness was measured at three points using a micrometer, the average value thereof was taken as a thickness S of the fiber-reinforced plastic, and the expansion ratio was measured from S/R.

(15) Measurement of Maximum Expansion Coefficient

In the examples, a thermoplastic prepreg before the incision was inserted was cut into a size of 50 mm×50 mm, the thickness was measured at three points using a micrometer, and the average value thereof was defined as the thickness P [mm] of the thermoplastic prepreg. Next, the thermoplastic prepreg was left standing for 1 hour in a thermostatic chamber set at an atmospheric temperature of 180° C. to expand the thermoplastic prepreg, thereby obtaining a fiber-reinforced plastic. The fiber-reinforced plastic was taken out, the thickness was measured at three points using a micrometer, and the average value thereof was taken as the thickness Q [mm] of the fiber-reinforced plastic. Using the measured P and Q, Q/P was calculated to obtain the maximum expansion coefficient Y.

(16) Shape Evaluation

In the fiber-reinforced plastic obtained in the moldability test 3, focusing on the surface on the side in contact with the lower mold shown in FIG. 8(*a*), the quality of a corner at a shape evaluation position 23 was evaluated in the four stages of A, B, C, and D shown below. In addition, the shape of a corner portion of the lower mold is a right angle, and it is evaluated that a degree of reproduction of a mold shape is high and a dimensional accuracy is excellent in the order of A, B, C, and D.

A: It had a vertical angle equivalent to the mold shape.
B: It had slightly rounded corner portions with a radius of less than 1 mm.
C: It had corner portions with a small radius of 1 mm or more and less than 3 mm.
D: It had a corner portion having a large roundness with a radius of 3 mm or more.

(17) Density

A rectangular parallelepiped test piece of 10 mm×10 mm×the thickness [mm] of the fiber-reinforced plastic was cut out from the fiber-reinforced plastic obtained in the moldability test 3, the length, width, and thickness of the test piece were measured with a micrometer, and a volume V [mm$^3$] of the test piece was calculated from the obtained values. Further, a mass M of the test piece used for the measurement was measured by an electronic balance. A density p of the fiber-reinforced plastic was calculated by substituting the obtained mass M and the volume V into the following equation.

$$\rho[g/cm^3]=10^3 \times M \,[g]/V \,[mm^3]$$

Example 1

[Thermoplastic Resin Sheet (1)]

A thermoplastic resin sheet (1) containing 50 wt % of an unmodified polypropylene resin ("Prime Polypro®)" J105G manufactured by Prime Polymer Co., Ltd.) and 50 wt % of an acid-modified polypropylene resin ("Admer" QB510 manufactured by Mitsui Chemicals, Inc.) and having a basis weight of 100 g/m$^2$ was prepared.

[Discontinuous Reinforcing Fiber Web (1)]

The reinforcing fibers (1) (a PAN-based continuous carbon fiber bundle having a tensile strength of 4900 MPa, a tensile modulus of elasticity of 230 GPa, and a total number of monofilaments of 12,000) were cut to 6 mm with a cartridge cutter to obtain the discontinuous reinforcing fibers.

A dispersion liquid containing water and a surfactant (polyoxyethylene lauryl ether (trade name) manufactured by NACALAI TESQUE, INC.) and having a concentration of 0.1 wt % was prepared.

Using the dispersion liquid and the discontinuous reinforcing fibers above, the discontinuous reinforcing fiber web (1) was produced by a manufacturing apparatus of the discontinuous reinforcing fiber web.

The manufacturing apparatus of the discontinuous reinforcing fiber web includes a papermaking tank, a cylindrical vessel with a diameter of 1,000 mm having an opening cock at the lower part of the vessel as a dispersion tank and a linear transportation unit (an inclination angle of 30°) connecting the dispersing tank and a paper-making tank. A stirrer is attached to the opening portion on an upper surface of the dispersion tank, and the discontinuous reinforcing fibers and the dispersion liquid (a dispersion medium) can be charged from the opening portion. The papermaking tank is a tank including a mesh conveyor having a papermaking surface with a width of 500 mm at a bottom portion, and a conveyor capable of carrying a papermaking base material is connected to the mesh conveyor.

Papermaking was performed with a discontinuous reinforcing fiber concentration in the dispersion liquid of 0.05 wt %. The paper-made discontinuous reinforcing fibers was dried in a drying furnace at 200° C. for 30 minutes. The obtained discontinuous reinforcing fiber web (1) had a width of 500 mm, a length of 500 mm, and a basis weight of 100 g/m$^2$.

[Resin-Impregnated Base Material (1)]

The discontinuous reinforcing fiber web (1) and the thermoplastic resin sheet (1) were laminated in the order of [thermoplastic resin sheet (1)/discontinuous reinforcing fiber web (1)/thermoplastic resin sheet (1)], and a pressure of 5 MPa was applied at a temperature of 230° C. for 2 minutes to prepare a resin-impregnated base material (1) in which the discontinuous reinforcing fiber web (1) was impregnated with the thermoplastic resin.

By pressing a rotary blade provided with a blade at a predetermined position against the resin-impregnated base material (1), cuts with a regular pattern as shown in FIG. 3(*b*) were inserted so that the sum of the incision lengths converted per 1 m$^2$ was 100 m on both the front and back surfaces to obtain the thermoplastic prepreg. The incisions were provided over the entire surface of the thermoplastic prepreg, and the incision depth reached a position of 60% of the thickness of the discontinuous reinforcing fiber web.

In the <Evaluation method> (1) above, when the in-plane fiber orientation direction of the thermoplastic prepreg was measured according to measurement of the orientation angle of the reinforcing fibers in the thermoplastic prepreg, it was found that the discontinuous reinforcing fibers were oriented in three or more directions. Further, the ratio of the thermoplastic prepreg having the two-dimensional orientation angle of 1° or more was 90%. Furthermore, the average value of two-dimensional orientation angles was 40°. In other words, the reinforcing fibers were monofilaments and randomly oriented.

Further, when the weight ratio of the thermoplastic resin and the discontinuous reinforcing fibers contained in the thermoplastic prepreg was measured according to (2) above, the weight ratio of the thermoplastic resin was 67 wt %, and the weight ratio of the discontinuous reinforcing fibers was 33 wt %.

The thermoplastic prepreg was cut into a size of 100 mm×100 mm, and 4 sheets were laminated. Thereafter, the laminate was heated in a thermostatic chamber at 140° C., and pressurized at a pressure of 1 MPa to integrate the thermoplastic prepregs. Using the resulting molded base material, the moldability test 1 was performed.

Further, the thermoplastic prepreg was cut into a size of 150 mm×150 mm, and four sheets of the cut thermoplastic prepreg were laminated, and then the obtained molded base material was subjected to the moldability test 2.

Example 2

The thermoplastic prepreg was prepared in the same manner as in Example 1 except that the incisions were provided so as to penetrate the discontinuous reinforcing fiber web, and the moldability test 1 was performed.

The fiber length distribution of the discontinuous reinforcing fibers contained in the thermoplastic prepreg was acquired according to (4) above, and a fiber length histogram was created. The coefficient of variation of the fiber length, the rank at which the frequency in the created histogram is the maximum, and the number of ranks at which the frequency is 10% or more are shown in Table 1.

The thermoplastic prepreg was cut into a size of 100 mm×100 mm, and 4 sheets were laminated. Thereafter, the laminate was heated in a thermostatic chamber at 140° C., and pressurized at a pressure of 1 MPa to be integrated. Using the integrated prepreg laminate, the moldability test 3 was performed.

Example 3

The thermoplastic prepreg was prepared in the same manner as in Example 2 except that incision and insertion were performed irregularly by hand using a cutter, and the moldability test 1 was performed.

Example 4

The thermoplastic prepreg was prepared in the same manner as in Example 2 except that the incisions were inserted such that the sum of the incision lengths converted per 1 $m^2$ was 20 m on both the front and back surfaces, and the moldability test 1 and the moldability test 3 were performed.

Example 5

The thermoplastic prepreg was prepared in the same manner as in Example 2 except that the incisions were inserted such that the sum of the incision lengths converted per 1 $m^2$ was 40 m on both the front and back surfaces, and the moldability test 1 and the moldability test 3 were performed.

Example 6

The thermoplastic prepreg was prepared in the same manner as in Example 2 except that the incisions were inserted such that the sum of the incision lengths converted per 1 $m^2$ was 400 m on both the front and back surfaces, and the moldability test 1 and the moldability test 3 were performed.

Example 7-1

The thermoplastic prepreg was prepared in the same manner as in Example 2 except that the incisions were inserted such that the sum of the incision lengths converted per 1 $m^2$ was 200 m on both the front and back surfaces, and the moldability test 1 and the moldability test 3 were performed.

Example 7-2

Using the thermoplastic prepreg prepared in Example 7-1, the moldability test 1 was performed using a molded base material prepared without integration after lamination.

Example 7-3

[Thermosetting Prepreg]

An epoxy resin (Epicoat® 828:40 parts by mass manufactured by Japan Epoxy Resin Co., Ltd., Epicoat® 1007 FS:25 parts by mass manufactured by Japan Epoxy Resin Co., Ltd., EPICLON® N740:35 parts by mass manufactured by DIC Corporation), and a thermoplastic resin polyvinyl formal ("VINYREC®" K:3 parts by mass manufactured by CHISSO CORPORATION) were charged into a beaker, heated to 80° C., and heated and kneaded for 30 minutes.

A resin temperature was lowered to 30° C., and then 3.5 parts by mass of a curing agent dicyandiamide (DICY7 manufactured by Japan Epoxy Resins Co., Ltd.) and 2 parts by mass of a curing accelerator 2,4-toluenebis (dimethylurea) ("OMICURE®" 24 manufactured by PTI JAPAN CO., LTD.) were added, and the mixture was stirred for 10 minutes, and then taken out from a kneader to obtain an epoxy resin composition.

The obtained epoxy resin composition was applied onto a silicone-coated release paper having a thickness of 100 μm using a reverse roll coater to prepare a thermosetting resin sheet (1) of 29 $g/m^2$.

The reinforcing fibers (1) were aligned unidirectionally on a sheet, the thermosetting resin sheet (1) were laminated on each other from both surfaces of the sheet, and heated and pressed to impregnate the thermosetting resin sheet (1) with the resin composition, thereby producing a thermosetting prepreg (1) having a reinforcing fiber basis weight of 100 $g/m^2$, a reinforcing fiber of 63 wt %, and the reinforcing fibers oriented unidirectionally.

The moldability test 1 was performed by disposing one layer of thermosetting prepreg (1) having the same size as the thermoplastic prepreg on each of the upper and lower surfaces of the molded base material similar to that in Example 7-1. At this time, the fiber orientation directions of the thermosetting prepreg (1) on both surfaces were the same.

As a result, the extension rate was 1.8, and the film had a surface quality of "A" in the appearance evaluation. However, only the thermoplastic prepreg clearly increased the projected area, and the projected area of the thermosetting prepreg (1) hardly changed before and after pressing. Further, as a result of dynamic evaluation, the bending strength was 1200 MPa, and the bending elastic modulus was 90.0 GPa. In addition, in an evaluation on mechanical properties, the test piece was prepared such that the fiber orientation direction of the thermosetting prepreg (1) in a front layer was along a longitudinal direction of the test piece.

Example 8

The thermoplastic prepreg was prepared in the same manner as in Example 2 except that the incisions were inserted such that the sum of the incision lengths converted per 1 $m^2$ was 800 m on both the front and back surfaces, and the moldability test 1 and the moldability test 3 were performed.

Comparative Example 1

The moldability test 1, the moldability test 2, and the moldability test 3 were performed using the resin-impregnated base material (1) as it was as the thermoplastic prepreg without inserting the incisions.

The configurations and moldability test results of the thermoplastic prepregs produced in the examples and the comparative examples are shown in Table 1.

TABLE 1

| | Thermoplastic prepreg | | | | |
|---|---|---|---|---|---|
| | Orientation direction of reinforcing fiber in a plane | Ratio of reinforcing fiber monofilaments having two-dimensional orientation angle of 1° or more | Average value of two-dimensional orientation angles | Ratio of incision depth | Arrangement of incisions |
| Example 1 | three directions or more | 90% | 40° | 60% | Regular |
| Example 2 | three directions or more | 90% | 40° | 100% | Regular |
| Example 3 | three directions or more | 90% | 40° | 100% | Irregular |
| Example 4 | three directions or more | 90% | 40° | 100% | Regular |
| Example 5 | three directions or more | 90% | 40° | 100% | Regular |
| Example 6 | three directions or more | 90% | 40° | 100% | Regular |
| Example 7-1 | three directions or more | 90% | 40° | 100% | Regular |
| Example 7-2 | three directions or more | 90% | 40° | 100% | Regular |
| Example 7-3 | three directions or more | 90% | 40° | 100% | Regular |
| Example 8 | three directions or more | 90% | 40° | 100% | Regular |
| Comparative Example 1 | three directions or more | 90% | 40° | — | — |

| | Thermoplastic prepreg | | | | | |
|---|---|---|---|---|---|---|
| | Sum of incision lengths converted per 1 m² | Coefficient of variation of fiber length | Frequency with highest grade | Number of grades whose frequency is 10% or more | Average fiber length | Expansion ratio |
| Example 1 | 100 m | 60% | 55% | 4 | 5.2 mm | 6 |
| Example 2 | 100 m | 60% | 55% | 4 | 4.1 mm | 6 |
| Example 3 | 100 m | 60% | 55% | 4 | 5.3 mm | 6 |
| Example 4 | 20 m | 45% | 60% | 2 | 5.1 mm | 6 |
| Example 5 | 40 m | 50% | 50% | 3 | 4.6 mm | 6 |
| Example 6 | 400 m | 75% | 35% | 5 | 2.8 mm | 6 |
| Example 7-1 | 200 m | 70% | 40% | 5 | 3.3 mm | 6 |
| Example 7-2 | 200 m | 70% | 40% | 5 | 3.3 mm | 6 |
| Example 7-3 | 200 m | 70% | 40% | 5 | 3.3 mm | 6 |
| Example 8 | 800 m | 80% | 30% | 6 | 2.4 mm | 6 |
| Comparative Example 1 | — | 0 | 1 | 1 | 6.0 mm | 6 |

| | Prepreg laminate | | Moldability evaluation | | | |
|---|---|---|---|---|---|---|
| | Configuration Thermoplastic prepreg: A Thermosetting prepreg: B | Aspects | Molding conditions | | | Length of end portion |
| | | | Moldability tests | Molding pressure [MPa] | Extension rate | X/Y | arrangement structure [mm] |
| Example 1 | [A/A/A/A] | Integration after lamination | Moldability test 1 | 3 | 1.3 | 16.7 | 1.2 |
| | | | Moldability test 2 | 3 | 1.3 | 16.7 | 1.2 |
| Example 2 | [A/A/A/A] | Integration after lamination | Moldability test 1 | 3 | 1.3 | 16.7 | 1.2 |
| | | | Moldability test 3 | 3 | Not evaluated | 16.7 | 1.2 |
| Example 3 | [A/A/A/A] | Integration after lamination | Moldability test 1 | 3 | 1.3 | 16.7 | 3.1 |
| Example 4 | [A/A/A/A] | Integration after lamination | Moldability test 1 | 3 | 1.1 | 3.3 | 1.2 |
| | | | Moldability test 3 | 3 | Not evaluated | 3.3 | 1.2 |
| Example 5 | [A/A/A/A] | Integration after lamination | Moldability test 1 | 3 | 1.2 | 6.7 | 1.2 |
| | | | Moldability test 3 | 3 | Not evaluated | 6.7 | 1.2 |
| Example 6 | [A/A/A/A] | Integration after lamination | Moldability test 1 | 3 | 2.1 | 66.7 | 1.1 |
| | | | Moldability test 3 | 3 | Not evaluated | 66.7 | 1.2 |
| Example 7-1 | [A/A/A/A] | Integration after lamination | Moldability test 1 | 3 | 1.8 | 33.3 | 1.1 |
| | | | Moldability test 3 | 3 | Not evaluated | 33.3 | 1.2 |

TABLE 1-continued

| | | | | | | | | |
|---|---|---|---|---|---|---|---|---|
| Example 7-2 | [A/A/A/A] | Only lamination | Moldability test 1 | 3 | 1.8 | 33.3 | 1.2 |
| Example 7-3 | [B/A/A/A/B] | Integration after lamination | Moldability test 1 | 3 | 1.8 | 33.3 | 1.1 |
| Example 8 | [A/A/A/A] | Integration after lamination | Moldability test 1 | 3 | 2.1 | 133.3 | 1.1 |
| | | | Moldability test 3 | 3 | Not evaluated | 133.3 | 1.2 |
| Comparative Example 1 | [A/A/A/A] | Integration after lamination | Moldability test 1 | 3 | 1.0 | 0.0 | 0.0 |
| | | | Moldability test 2 | 3 | 1.0 | 0.0 | 0.0 |
| | | | Moldability test 1 | 10 | 1.5 | 0.0 | 10 |
| | | | Moldability test 2 | 10 | 1.5 | 0.0 | 10 |
| | | | Moldability test 3 | 3 | Not evaluated | 0.0 | 10 |

| | | | | Dynamic characteristics | |
|---|---|---|---|---|---|
| | Moldability evaluation | | | Bending | Bending elastic |
| | Density | Appearance evaluation | Shape evaluation | strength [MPa] | modulus [GPa] |
| Example 1 | Not evaluated | Appearance evaluation 1: B | Not evaluated | 260 | 16.0 |
| | Not evaluated | Appearance evaluation 1: B | Not evaluated | Not evaluated | Not evaluated |
| Example 2 | Not evaluated | Appearance evaluation 1: B | Not evaluated | 258 | 15.9 |
| | 0.3 | Appearance evaluation 2: A | A | Not evaluated | Not evaluated |
| Example 3 | Not evaluated | Appearance evaluation 1: C | Not evaluated | 260 | 16.1 |
| Example 4 | Not evaluated | Appearance evaluation 1: B | Not evaluated | 271 | 16.5 |
| | 0.3 | Appearance evaluation 2: C | C | Not evaluated | Not evaluated |
| Example 5 | Not evaluated | Appearance evaluation 1: B | Not evaluated | 265 | 16.4 |
| | 0.3 | Appearance evaluation 2: B | B | Not evaluated | Not evaluated |
| Example 6 | Not evaluated | Appearance evaluation 1: A | Not evaluated | 251 | 15.5 |
| | 0.3 | Appearance evaluation 2: A | A | Not evaluated | Not evaluated |
| Example 7-1 | Not evaluated | Appearance evaluation 1: A | Not evaluated | 255 | 15.7 |
| | 0.3 | Appearance evaluation 2: A | A | Not evaluated | Not evaluated |
| Example 7-2 | Not evaluated | Appearance evaluation 1: B | Not evaluated | 254 | 15.6 |
| Example 7-3 | Not evaluated | Appearance evaluation 1: A | Not evaluated | 1200 | 90.0 |
| Example 8 | Not evaluated | Appearance evaluation 1: A | Not evaluated | 245 | 15.3 |
| | 0.3 | Appearance evaluation 2: B | C | Not evaluated | Not evaluated |
| Comparative Example 1 | Not evaluated | Appearance evaluation 1: — | Not evaluated | Not evaluated | Not evaluated |
| | Not evaluated | Appearance evaluation 1: — | Not evaluated | Not evaluated | Not evaluated |
| | Not evaluated | Appearance evaluation 1: D | Not evaluated | Not evaluated | Not evaluated |
| | Not evaluated | Appearance evaluation 1: D | Not evaluated | Not evaluated | Not evaluated |
| | Not evaluated | Appearance evaluation 2: D | D | Not evaluated | Not evaluated |

DESCRIPTION OF REFERENCE SIGNS

1: Incision
2: Incised region
3: Thermoplastic prepreg
4: Discontinuous reinforcing fiber web
5: Surface on which incision 1 is inserted
6: Surface opposite to one on which incision 1 is inserted
7: Tip of incision
8: Incision depth
9: Thickness of discontinuous reinforcing fiber web
10: Incision unit
11: Grade having highest frequency
12: Grade having longer fiber length than grade having highest frequency
13: Long fiber grade group
14: Grade having shorter fiber length than grade having highest frequency
15: Short fiber grade group
16: Reinforcing fiber monofilament
17: Two-dimensional orientation angle
18: Specific reinforcing fiber monofilament
19: Circle centered at end portion of specific reinforcing fiber monofilament

US 12,576,558 B2

33

20: Another reinforcing fiber monofilament
21: Line segment
22: Line segment group
23: Shape evaluation position
24: Lower mold
25: Upper mold
26: Fiber-reinforced plastic
27: Radius of corner portion

The invention claimed is:

1. A thermoplastic prepreg obtained by impregnating a discontinuous reinforcing fiber web with a thermoplastic resin, the thermoplastic prepreg satisfying at least one of the following features (A) or (B):

feature (A): a plurality of incisions cut at least a portion of discontinuous reinforcing fibers constituting the discontinuous reinforcing fiber web, wherein the incisions are regularly arranged and reach a depth of 100% in the thickness direction of the discontinuous reinforcing fiber web; and feature (B): a fiber length variation region of the discontinuous reinforcing fibers constituting the discontinuous reinforcing fiber web is included, where the discontinuous reinforcing fibers have a coefficient of variation in fiber length of is 40% or more, wherein when a histogram of fiber length distribution of the discontinuous reinforcing fibers in the fiber length variation region is created under the following conditions, the highest frequency is 70% or less:

lengths of discontinuous reinforcing fibers randomly selected from the discontinuous reinforcing fibers in the fiber length variation region are measured, and a range from minimum fiber length to maximum fiber length is equally divided into nine fiber length ranges, thereby creating a histogram with a grade number of 9 on a horizontal axis; and frequency on a vertical axis, where the frequency is a ratio [%] of number of single fibers of discontinuous reinforcing fibers belonging to each grade when the total number of randomly selected single fibers of the discontinuous reinforcing fibers is taken as 100%.

2. The thermoplastic prepreg according to claim 1, comprising 40 wt % or more and 90 wt % or less of the thermoplastic resin and 10 wt % or more and 60 wt % or less of the discontinuous reinforcing fibers.

3. The thermoplastic prepreg according to claim 1, wherein the thermoplastic prepreg satisfies the feature (A), and an average fiber length of the discontinuous reinforcing fibers is in a range of 2 mm or more and 20 mm or less.

4. The thermoplastic prepreg according to claim 1, wherein the thermoplastic prepreg satisfies the feature (A), and a sum of incision lengths converted per 1 m² in an incised region in which the incisions are formed is 40 m or more.

5. The thermoplastic prepreg according to claim 1, wherein the thermoplastic prepreg satisfies the feature (A), and a sum of incision lengths converted per 1 m² in an incised region where the incisions are formed is 40 m or more and 500 m or less.

6. The thermoplastic prepreg according to claim 1, wherein there are three or more grades having a frequency of 10% or more in the histogram.

7. The thermoplastic prepreg according to claim 1, wherein when a thickness of a precursor obtained by cutting out a region having the plurality of incisions or only the fiber length variation region from the thermoplastic prepreg is R [mm], and a thickness of a fiber-reinforced plastic obtained by heating the precursor to a temperature equal to or higher than a temperature at which the thermoplastic resin is melted or softened and then holding the precursor under an atmospheric pressure for one hour is S [mm], an expansion ratio determined by S/R is 2.0 or more.

8. The thermoplastic prepreg according to claim 1, wherein the thermoplastic prepreg satisfies the feature (A) and the feature (B), and a plurality of incisions for cutting at least a portion of the reinforcing fibers contained in the discontinuous reinforcing fiber web is formed in the fiber length variation region.

9. The thermoplastic prepreg according to claim 1, wherein the discontinuous reinforcing fibers are monofilaments.

10. The thermoplastic prepreg according to claim 1, wherein the discontinuous reinforcing fibers are randomly oriented in a plane.

11. A fiber-reinforced plastic obtained by molding the thermoplastic prepreg according to claim 1 alone or by laminating two or more thermoplastic prepregs.

12. A method for producing the thermoplastic prepreg according to claim 1, the method comprising:

a web preparation step for preparing a discontinuous reinforcing fiber web;

an impregnation step of impregnating the discontinuous reinforcing fiber web with a thermoplastic resin; and an incision step of inserting a plurality of incisions so as to cut at least a portion of discontinuous reinforcing fibers constituting the discontinuous reinforcing fiber web.

13. A method for producing a fiber-reinforced plastic, the method comprising a heating and pressurizing step of heating the thermoplastic resin and pressurizing a molded base material containing the thermoplastic prepreg according to claim 1 in a state where the thermoplastic resin is melted or softened.

14. The method for producing a fiber-reinforced plastic according to claim 13, wherein in the heating and pressurizing step, the molded base material is deformed so that a projected area of the molded base material in a thickness direction increases.

15. The method for producing a fiber-reinforced plastic according to claim 14, wherein the molded base material is pressurized so that S2/S1≥1.6, where S1 is a projected area in the thickness direction of the molded base material before pressurization and S2 is a projected area after the pressurization.

16. The method for producing a fiber-reinforced plastic according to claim 13, further comprising:

an expansion step of reducing the pressure applied in the heating and pressurizing step to a pressure equal to or lower than an expansion pressure of the molded base material caused by a raising force of the discontinuous reinforcing fibers; and a solidification step of cooling the molded base material and solidifying the thermoplastic resin, which are performed in this order.

17. The method for producing a fiber-reinforced plastic according to claim 13, the method using, as the thermoplastic prepreg, a thermoplastic prepreg that satisfies the feature (A) and satisfies 5≤X/Y≤100, where X[m] is a sum of incision lengths in an incised region where the incisions are formed, the incision lengths being converted per 1 m², and Y is a maximum expansion coefficient of the thermoplastic prepreg in a region other than the incised region, the maximum expansion coefficient being determined as follows:

maximum expansion coefficient Y, that is, a value determined by Q/P, where P [mm] is a thickness of a precursor obtained by taking out a region other than the incised region from the thermoplastic prepreg, and Q [mm] is a thickness of a fiber-reinforced plastic obtained by heating the precursor to a temperature at which the thermoplastic resin is melted or softened in the heating and pressurizing step and then holding the precursor under an atmospheric pressure for one hour.

18. A fiber-reinforced plastic having a thermoplastic resin layer containing discontinuous reinforcing fibers and a thermoplastic resin, the fiber-reinforced plastic satisfying at least one of the following features (C) or (D):

feature (C), that is, the thermoplastic resin layer has an end portion arrangement structure in which end portions of the discontinuous reinforcing fibers oriented in three or more directions are continuously arranged; and feature (D), that is, the thermoplastic resin layer has a fiber length variation portion in which a coefficient of variation in fiber length of the discontinuous reinforcing fibers contained in the thermoplastic resin layer is 40% or more.

19. The fiber-reinforced plastic according to claim 18, wherein at least a part of the contact points at which the discontinuous reinforcing fibers cross each other is bonded with the thermoplastic resin, and the fiber-reinforced plastic has a porous structure including vacant spaces as a portion where neither the discontinuous reinforcing fibers nor the thermoplastic resin is present.

20. The fiber-reinforced plastic according to claim 19, wherein the feature (C) is satisfied, and the end portion arrangement structure is present inside the porous structure, and a length of the end portion arrangement structure is shorter than an average fiber length of the discontinuous reinforcing fibers.

21. The fiber-reinforced plastic according to claim 18, wherein the feature (C) is satisfied, and the length of the end portion arrangement structure is shorter than the average fiber length of the reinforcing fibers.

22. The fiber-reinforced plastic according to claim 18, wherein the feature (D) is satisfied, and in the fiber length variation portion, when a histogram showing a fiber length distribution of the discontinuous reinforcing fibers is created under a condition below, the highest frequency is 70% or less, with the condition as, length of discontinuous reinforcing fibers randomly selected from the discontinuous reinforcing fibers included in the fiber length variation portion are measured, and a range from a minimum fiber length to a maximum fiber length is equally divided into nine, thereby creating a histogram with a grade number of 9; and the frequency is a ratio [%] of number of single fibers of discontinuous reinforcing fibers belonging to each grade when number of all single fibers of the discontinuous reinforcing fibers randomly selected is taken as 100%.

23. The fiber-reinforced plastic according to claim 22, wherein there are three or more grades having a frequency of 10% or more in the histogram.

* * * * *